US012785894B2

(12) United States Patent
Huang et al.

(10) Patent No.: US 12,785,894 B2
(45) Date of Patent: Nov. 3, 2026

(54) SIGNAL TRANSMISSION METHOD AND APPARATUS

(71) Applicant: Huawei Technologies Co., Ltd., Shenzhen (CN)

(72) Inventors: Huang Huang, Shenzhen (CN); Kuandong Gao, Shenzhen (CN); Qianli Ma, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 292 days.

(21) Appl. No.: 18/541,610

(22) Filed: Dec. 15, 2023

(65) Prior Publication Data

US 2024/0113836 A1 Apr. 4, 2024

Related U.S. Application Data

(63) Continuation of application No. PCT/CN2022/096457, filed on May 31, 2022.

(30) Foreign Application Priority Data

Jun. 18, 2021 (CN) ......................... 202110680245.3

(51) Int. Cl.

| | |
|---|---|
| ***H04L 5/00*** | (2006.01) |
| ***H04B 17/309*** | (2015.01) |
| ***H04L 1/00*** | (2006.01) |
| ***H04L 27/26*** | (2006.01) |

(52) U.S. Cl.

CPC ......... *H04L 5/0051* (2013.01); *H04B 17/346* (2023.05); *H04L 1/0003* (2013.01); *H04L 27/261* (2013.01)

(58) Field of Classification Search

CPC . H04L 5/0048; H04L 5/0051; H04L 27/2613; H04L 1/0003; H04L 5/00; H04L 5/0007; H04L 27/261; H04L 27/2636; H04L 27/2657; H04L 27/2672; H04L 27/2675; H04L 27/2698; H04B 17/26; H04B 17/345; H04B 17/346; H04B 17/347

See application file for complete search history.

(56) References Cited

U.S. PATENT DOCUMENTS

| | | | | |
|---|---|---|---|---|
| 7,515,653 | B2 * | 4/2009 | Lee | H04H 40/18<br>375/147 |
| 9,118,401 | B1 * | 8/2015 | Nieto | H04B 1/7102 |
| 9,507,007 | B2 * | 11/2016 | Markhovsky | G01S 13/222 |
| 10,116,479 | B2 * | 10/2018 | Yun | H04L 27/26416 |

(Continued)

OTHER PUBLICATIONS

3GPP TS 38.211 V16.5.0 (Mar. 2021), 3rd Generation Partnership Project; Technical Specification Group Radio Access Network; NR; Physical channels and modulation (Release 16), total 134 pages.

(Continued)

*Primary Examiner* — Bailor C Hsu
(74) *Attorney, Agent, or Firm* — Slater Matsil, LLP

(57) ABSTRACT

A method includes a transmitting end sending a first signal that includes a data signal and a reference signal. A first imaginary reference signal in the reference signal is located at a real signal location of the first signal, and/or a first real reference signal in the reference signal is located at an imaginary signal location of the first signal; and the reference signal is used for phase noise estimation.

20 Claims, 14 Drawing Sheets

(56) References Cited

U.S. PATENT DOCUMENTS

| | | | | |
|---|---|---|---|---|
| 10,333,764 | B1 * | 6/2019 | Arditti Ilitzky | H03C 3/403 |
| 11,522,743 | B2 * | 12/2022 | Stirling-Gallacher | H04B 7/088 |
| 2009/0316569 | A1 | 12/2009 | Lele et al. | |
| 2012/0208523 | A1 * | 8/2012 | Hans | H04W 64/00 455/7 |
| 2016/0277173 | A1 * | 9/2016 | Dutronc | H04W 72/0446 |
| 2017/0279508 | A1 * | 9/2017 | Truong | H04B 7/0626 |
| 2018/0198651 | A1 * | 7/2018 | Kundargi | H04L 25/0204 |
| 2021/0306935 | A1 * | 9/2021 | Do | H04W 48/16 |
| 2023/0060032 | A1 * | 2/2023 | Newman | H04L 27/22 |

OTHER PUBLICATIONS

3GPP TS 38.214 V15.12.0 (Mar. 2021), 3rd Generation Partnership Project; Technical Specification Group Radio Access Network; NR; Physical layer procedures for data (Release 15), total 106 pages.

Hangyu Zhao et al., "A Phase Noise Suppression Method Based on Real-imaginary Alternating pilots for Coherent Optical OFDM-OQAM Communication Systems", Proceedings of the 2023 13th International Conference on Communication and Network Security, Dec. 6, 2023 (Dec. 6, 2023), pp. 323-329, XP093199911.

* cited by examiner (a) (b)

SIGNAL TRANSMISSION METHOD AND APPARATUS

CROSS-REFERENCE TO RELATED APPLICATIONS

This application is a continuation of International Application No. PCT/CN2022/096457, filed on May 31, 2022, which claims priority to Chinese Patent Application No. 202110680245.3, filed on Jun. 18, 2021. The disclosures of the aforementioned applications are hereby incorporated by reference in their entireties.

TECHNICAL FIELD

This application relates to the field of wireless communication technologies, and in particular, to a signal transmission method and an apparatus.

BACKGROUND

In a wireless communication process, a transmitting end processes data that needs to be sent, and sends a processed signal to a receiving end through a radio channel, and the receiving end processes the received signal, to obtain data sent by the transmitting end.

A signal is transmitted on a radio channel in a form of an electromagnetic wave, and in a transmission process of the electromagnetic wave, problems such as a path loss and phase noise exist. Due to the phase noise, performance of a communication system is deteriorated or even the communication system cannot work. Therefore, a method for estimating and removing phase noise is urgently required.

SUMMARY

This application provides a signal transmission method and an apparatus, to estimate phase noise, improve phase noise estimation precision, and reduce overheads.

According to a first aspect, a signal transmission method is provided. In the method, a transmitting end obtains a first signal, and sends the first signal. The first signal includes a data signal and M reference signals, and the M reference signals include at least one of the following: M1 first imaginary reference signals and M2 first real reference signals, where M=M1+M2, M is an integer greater than 0, M1 is an integer greater than or equal to 0, and M2 is an integer greater than or equal to 0. The M1 first imaginary reference signals are located at a real signal location of the first signal. The M2 first real reference signals are located at an imaginary signal location of the first signal.

That is, the first signal may include the M1 first imaginary reference signals, or the first signal may include the M2 first real reference signals, or the first signal may include the M1 first imaginary reference signals and the M2 first real reference signals.

The data signal maybe a complex signal, and the data signal maybe separated into a real data signal and an imaginary data signal, where the real data signal is located at a real signal location, and the imaginary data signal is located at an imaginary signal location.

The real signal location may be a location of an even index, and the imaginary signal location may be a location of an odd index. Alternatively, the real signal location may be a location of an odd index, and the imaginary signal location may be a location of an even index.

In the method, the first imaginary reference signal at the real signal location and/or the first real reference signal at the imaginary signal location are/is used for phase noise estimation, so that a receiving end can estimate phase noise and remove the estimated phase noise. In addition, the method can further improve phase noise estimation precision and reduce signal overheads. The method is further applicable to different scenarios such as a single-user scenario and a multi-user scenario.

In a possible design, the transmitting end and the receiving end may know an amplitude of the reference signal. Optionally, the amplitude of the reference signal is fixed. For example, amplitudes of the M1 first imaginary reference signals are a first preset value, and/or amplitudes of the M2 first real reference signals are a second preset value. The first preset value may be any value, the second preset value may be any value, and the first preset value may be the same as or different from the second preset value.

A polarity of the reference signal may represent positive and negative of an amplitude. The transmitting end may adjust the polarity of the reference signal, and the receiving end may estimate the polarity of the reference signal. In this way, the receiving end may estimate phase noise based on the amplitude of the reference signal and the estimated polarity. The polarity of the reference signal is related to one or more pieces of information.

In a possible design, a polarity of the reference signal is the same as or opposite to a polarity of an interference signal to the reference signal. For example, a polarity of the first imaginary reference signal is the same as or opposite to a polarity of an interference signal to the first imaginary reference signal, and a polarity of the first real reference signal is the same as or opposite to a polarity of an interference signal to the first real reference signal.

The interference signal to the first imaginary reference signal may include one or more of the following: a data signal, a first real reference signal, and a second imaginary reference signal, where the second imaginary reference signal is located at an imaginary signal location. For example, when there are only M1 first imaginary reference signals, the data signal interferes with the first imaginary reference signal, and when there are M3 second imaginary reference signals and M1 first imaginary reference signals, the M3 second imaginary reference signals and the data signal each interfere with the first imaginary reference signal. In a possible example, a real data signal located at a real signal location in the data signal interferes with the first imaginary reference signal.

The interference signal to the first real reference signal may include one or more of the following: a data signal, a first imaginary reference signal, and a second real reference signal, where the second real reference signal is located at a real signal location. For example, when there are only M2 first real reference signals, the data signal interferes with the first real reference signal, and when there are M4 second real reference signals and M2 first real reference signals, the M4 second real reference signals and the data signal each interfere with the first real reference signal. In a possible example, an imaginary data signal located at an imaginary signal location in the data signal interferes with the first real reference signal.

In a possible design, a polarity of the reference signal is the same as or opposite to a polarity of an adjacent signal of the reference signal. For example, a polarity of the first imaginary reference signal is the same as or opposite to a polarity of an adjacent first imaginary reference signal, and/or a polarity of the first real reference signal is the same as a polarity of an adjacent first real reference signal.

In a possible design, the data signal includes a real data signal and an imaginary data signal, the real data signal is located at a real signal location, and the imaginary data signal is located at an imaginary signal location; a polarity of the first imaginary reference signal is the same as or opposite to a polarity of an imaginary data signal adjacent to the first imaginary reference signal; and a polarity of the first real reference signal is the same as or opposite to a polarity of a real data signal adjacent to the first real reference signal.

In a possible design, a polarity of the reference signal is determined based on an identifier of a device that receives the first signal. The device that receives the first signal may be the receiving end.

In a possible design, a polarity of the reference signal is determined based on an identifier of a device that sends the first signal. The device that sends the first signal may be the transmitting end.

In a possible design, the transmitting end may further determine a signal value set of each polarity set from a plurality of polarity sets of the reference signal, where the polarity set includes M reference signals (optional) and polarities of the M reference signals, and the signal value set includes at least one of the following: a first signal value of an interference signal superimposed on the M1 first imaginary reference signals and a second signal value of an interference signal superimposed on the M2 first real reference signals; and select a first signal value or a second signal value with a minimum absolute value from each signal value set. If the transmitting end selects a first maximum value corresponding to the first signal value with the minimum absolute value, the transmitting end determines a first polarity set corresponding to a signal value set to which the first maximum value belongs, and determines polarities of the M reference signals based on the first polarity set. If the transmitting end selects a second maximum value corresponding to the second signal value with the minimum absolute value, the transmitting end determines a second polarity set corresponding to a signal value set to which the second maximum value belongs, and determines polarities of the M reference signals based on the second polarity set. In this design, an amplitude value of a smallest interference signal in the interference signals is maximized as much as possible to reduce a peak to average power ratio (peak to average power ratio, PAPR) of the signal.

In this design, the interference signal superimposed on the first imaginary reference signal is an interference signal to the first imaginary reference signal. The interference signal superimposed on the first real reference signal is an interference signal to the first real reference signal.

In a possible design, two imaginary data signals adjacent to the M1 first imaginary reference signals have a same amplitude and opposite polarities, and/or two real data signals adjacent to the M2 first real reference signals have a same amplitude and opposite polarities.

In a possible design, a signal value of the first signal is a fixed value, or is greater than a preset signal value.

In a possible design, the first signal further includes at least one of the following: M3 second imaginary reference signals and M4 second real reference signals, where M3 is an integer greater than or equal to 0, and M4 is an integer greater than or equal to 0. The second imaginary reference signal is located at an imaginary signal location, and/or the second real reference signal is located at a real signal location. The second imaginary reference signal and the second real reference signal are used as redundant reference signals, to further reduce a PAPR of the signal.

In a possible design, the second imaginary reference signal and the first imaginary reference signal are arranged at intervals, that is, a first imaginary reference signal is inserted between every two imaginary reference signals, and two imaginary reference signals are inserted between every two first imaginary reference signals, and/or the second real reference signal and the first real reference signal are arranged at intervals, that is, a first real reference signal is inserted between every two real reference signals, and a second real reference signal is inserted between every two first real reference signals.

In a possible design, interference signals of the first imaginary reference signal include a first interference signal and a second interference signal, the first interference signal is an interference signal caused by the data signal to the first imaginary reference signal, and the second interference signal is an interference signal caused by the M3 second imaginary reference signals to the first imaginary reference signal.

A sum (or an amplitude of the sum) of a value of the first interference signal and a value of the second interference signal is a third preset value, and/or a difference (or an amplitude of the difference) between the value of the first interference signal and the value of the second interference signal is a preset value.

In a possible design, interference signals of the first real reference signal include a third interference signal and a fourth interference signal, the third interference signal is an interference signal caused by the data signal to the first real reference signal, and the fourth interference signal is an interference signal caused by the M4 second real reference signals to the first real reference signal.

A sum (or an amplitude of the sum) of a value of the third interference signal and a value of the fourth interference signal is a fourth preset value, and/or a difference (or an amplitude of the difference) between the value of the third interference signal and the value of the fourth interference signal is a fourth preset value.

In a possible design, if the identifier of the device that receives the first signal is an odd number, the first signal may include the M1 first imaginary reference signals, and/or if the identifier of the device that receives the first signal is an even number, the first signal may include the M2 first real reference signals.

In a possible design, a sequence including the M1 first imaginary reference signals is orthogonal to a sequence including the M2 first real reference signals.

In a possible design, if a number of a port for sending the first signal is an odd number, the first signal may include the M1 first imaginary reference signals, and/or if a number of a port for sending the first signal is an even number, the first signal may include the M2 first real reference signals.

According to a second aspect, a signal transmission method is provided. In the method, the receiving end obtains a second signal, and processes the second signal to obtain a third signal. The third signal includes a data signal and M reference signals, and the M reference signals include at least one of the following: M1 first imaginary reference signals and M2 first real reference signals, where M=M1+M2, M is an integer greater than 0, M1 is an integer greater than or equal to 0, and M2 is an integer greater than or equal to 0. The M1 first imaginary reference signals are located at a real signal location of the third signal. The M2 first real reference signals are located at an imaginary signal location of the third signal. The receiving end may perform, on the second signal, inverse operation processing corresponding to generating the first signal, to estimate phase noise.

In a possible design, amplitudes of the M1 first imaginary reference signals are a first preset value; and amplitudes of the M2 first real reference signals are a second preset value.

In a possible design, a polarity of the reference signal is the same as or opposite to a polarity of an interference signal to the reference signal.

In a possible design, a polarity of the reference signal is the same as or opposite to a polarity of an adjacent signal of the reference signal. For example, a polarity of the first imaginary reference signal is the same as or opposite to a polarity of an adjacent first imaginary reference signal, and/or a polarity of the first real reference signal is the same as or opposite to a polarity of an adjacent first real reference signal.

In a possible design, the data signal includes a real data signal and an imaginary data signal, the real data signal is located at a real signal location, and the imaginary data signal is located at an imaginary signal location; a polarity of the first imaginary reference signal is the same as or opposite to a polarity of an imaginary data signal adjacent to the first imaginary reference signal; and a polarity of the first real reference signal is the same as or opposite to a polarity of a real data signal adjacent to the first real reference signal.

In a possible design, a polarity of the reference signal is determined based on an identifier of a device that receives the third signal. The device that receives the third signal may be the receiving end.

In a possible design, a polarity of the reference signal is determined based on an identifier of a device that sends the third signal. The device that sends the third signal maybe a transmitting end.

In a possible design, a polarity of the reference signal is the same as a polarity of the third signal.

In a possible design, two imaginary data signals adjacent to the M1 first imaginary reference signals have a same amplitude and opposite polarities, and/or two real data signals adjacent to the M2 first real reference signals have a same amplitude and opposite polarities.

In a possible design, the third signal further includes at least one of the following: M3 second imaginary reference signals and M4 second real reference signals, where M3 is an integer greater than or equal to 0, and M4 is an integer greater than or equal to 0. The second imaginary reference signal is located at an imaginary signal location, and/or the second real reference signal is located at a real signal location.

In a possible design, the second imaginary reference signal and the first imaginary reference signal are arranged at intervals; and the second real reference signal and the first real reference signal are arranged at intervals.

In a possible design, interference signals of the first imaginary reference signal include a first interference signal and a second interference signal, the first interference signal is an interference signal caused by the data signal to the first imaginary reference signal, and the second interference signal is an interference signal caused by the M3 second imaginary reference signals to the first imaginary reference signal.

A sum (or an amplitude of the sum) of a value of the first interference signal and a value of the second interference signal is a third preset value, and/or a difference (or an amplitude of the difference) between the value of the first interference signal and the value of the second interference signal is a preset value.

In a possible design, interference signals of the first real reference signal include a third interference signal and a fourth interference signal, the third interference signal is an interference signal caused by the data signal to the first real reference signal, and the fourth interference signal is an interference signal caused by the M4 second real reference signals to the first real reference signal.

A sum (or an amplitude of the sum) of a value of the third interference signal and a value of the fourth interference signal is a fourth preset value, and/or a difference (or an amplitude of the difference) between the value of the third interference signal and the value of the fourth interference signal is a preset value.

According to a third aspect, a communication apparatus is provided. The communication apparatus may be the foregoing transmitting end or receiving end, or may be a chip disposed in the transmitting end or the receiving end. The communication apparatus may implement the method according to the first aspect or the second aspect.

The communication apparatus includes a corresponding module, unit, or means (means) for implementing the foregoing method. The module, unit, or means may be implemented by using hardware or software, or implemented by using hardware executing corresponding software. The hardware or the software includes one or more modules or units corresponding to the foregoing functions.

According to a fourth aspect, a communication apparatus is provided, and includes a transceiver unit. Optionally, the communication apparatus further includes a processing unit. The communication apparatus may implement the method according to the first aspect or the second aspect.

According to a fifth aspect, a communication apparatus is provided, and includes a processor. The processor is coupled to a memory, and may be configured to execute instructions in the memory, so that the apparatus performs the method according to the first aspect or the second aspect. Optionally, the apparatus further includes the memory. Optionally, the apparatus further includes an interface circuit, and the processor is coupled to the interface circuit.

The interface circuit maybe a code/data read/write interface circuit, and the interface circuit is configured to: receive computer-executable instructions (the computer-executable instructions are stored in the memory, and maybe directly read from the memory, or may pass through another component), and transmit the computer-executable instructions to the processor, so that the processor runs the computer-executable instruction to perform the method according to any one of the foregoing aspects.

In some possible designs, the communication apparatus maybe a chip or a chip system.

According to a sixth aspect, a communication apparatus is provided, and includes a processor and a memory. The processor is configured to read instructions stored in the memory, may receive a signal by using a receiver, and transmits a signal by using a transmitter, to perform the method according to the first aspect or the second aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, for example, a read-only memory (read-only memory, ROM). The memory and the processor may be integrated into a same chip, or may be separately disposed on different chips. A type of the memory and a manner in which the memory and the processor are disposed are not limited in this embodiment of this application.

The communication apparatus may be a chip, and the processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated in the processor, or may be located outside the processor and exist independently.

According to a seventh aspect, a processor is provided, and includes an input circuit, an output circuit, and a processing circuit. The processing circuit is configured to: receive a signal through the input circuit, and transmit a signal through the output circuit, so that the processor performs the method according to the first aspect or the second aspect.

In a specific implementation process, the processor maybe a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to an eighth aspect, a communication apparatus is provided, and includes a logic circuit and an input/output interface. The input/output interface is configured to communicate with a module outside the communication apparatus, and the logic circuit is configured to run a computer program to perform the method according to any one of the foregoing aspects. The communication apparatus may be the transmitting end or the receiving end in the first aspect, the second aspect, or the third aspect, or an apparatus including the transmitting end or the receiving end, or an apparatus, for example, a chip, included in the transmitting end or the receiving end.

Alternatively, the input/output interface maybe a code/data read/write interface circuit, and the input/output interface is configured to: receive a computer program (the computer program is stored in a memory, and may be directly read from the memory, or may pass through another component), and transmit the computer program to the input/output interface, so that the input/output interface runs the computer program to perform the method according to any one of the foregoing aspects.

Optionally, the communication apparatus may be a chip.

According to a ninth aspect, a computer program product is provided. The computer program product includes a computer program (which may also be referred to as code or instructions), and when the computer program is run, a computer is enabled to perform the method according to the first aspect or the second aspect.

According to a tenth aspect, a computer-readable medium is provided. The computer-readable medium stores a computer program (which may also be referred to as code or instructions). When the computer program is run on a computer, the computer is enabled to perform the method according to the first aspect or the second aspect.

According to an eleventh aspect, a chip system is provided. The chip system includes a processor and an interface, and is configured to support a communication apparatus in implementing the function in the first aspect or the second aspect. In a possible design, the chip system further includes a memory, and the memory is configured to store necessary information and data of the foregoing communication apparatus. The chip system may include a chip, or may include a chip and another discrete component.

According to a twelfth aspect, a functional entity is provided. The functional entity is configured to implement the methods in the first aspect and the second aspect.

According to a thirteenth aspect, a communication system is provided, and includes the transmitting end and the receiving end in the first aspect or the second aspect.

For technical effects brought by any design of the third aspect to the thirteenth aspect, refer to the technical effects brought by the first aspect. Details are not described herein again.

DESCRIPTION OF EMBODIMENTS

Figure 1:
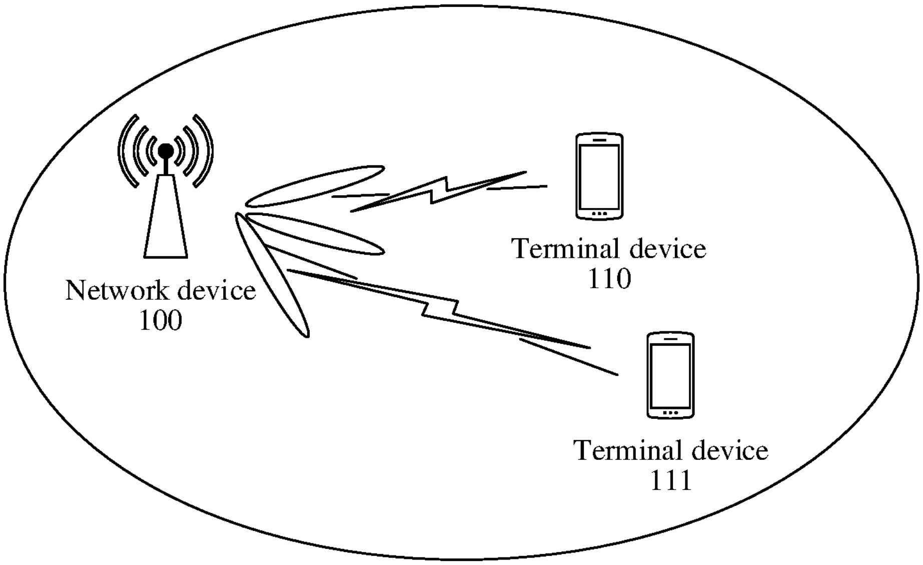
FIG. 1 is a schematic diagram of an architecture of a communication system.

The following further describes in detail this application with reference to accompanying drawings.

Various aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In addition, the word "example" in embodiments of this application is used to represent giving an example, an illustration, or a description. Any embodiment or design solution described as an "example" in this application should not be explained as being more preferred or having more advantages than another embodiment or design solution. Exactly, the term "example" is used to present a concept in a specific manner.

A network architecture and a service scenario described in embodiments of this application are intended to describe the technical solutions in embodiments of this application more clearly, and do not constitute a limitation on the technical solutions provided in embodiments of this application. A person of ordinary skill in the art may learn that, with evolution of the network architecture and emergence of a new service scenario, the technical solutions provided in embodiments of this application are also applicable to a similar technical problem.

The following describes some terms in embodiments of this application, to facilitate understanding of a person skilled in the art.

(1) Wireless communication system: includes a transmitting end and a receiving end. The transmitting end may modulate data that needs to be sent to obtain a modulation symbol, and generate a corresponding waveform (also referred to as an electromagnetic wave) by using a shaping filter in time-frequency domain. The transmitting end may transmit the waveform to a radio channel. The receiving end receives the waveform on the radio channel, and performs filtering by using a matching filter to obtain a demodulation signal.

The waveform is a graphical abstraction of distribution of a signal (also referred to as a radio signal) in time or frequency, that is, the waveform carries a signal. In wireless communication, the signal may be transmitted in different combinations of different symbols.

The radio channel, also referred to as a channel, represents a path between a transmitting end and a receiving end in wireless communication.

The transmitting end may be but is not limited to a ground device or a satellite. The receiving end may be but is not limited to a ground device or a satellite.

The transmitting end may be a terminal device or a network device. The receiving end may be a terminal device or a network device.

It may be understood that in some possible cases, the transmitting end may also be used as a receiving end to implement functions such as signal obtaining and processing, and the receiving end may also be used as a transmitting end to implement functions such as signal generation and sending. In other words, a physical device may be a transmitting end, or may be a receiving end, or may be both a transmitting end and a receiving end.

(2) Frequency band: is used for communication between a transmitting end and a receiving end. Usually, a frequency band has a plurality of channels. For example, a 2.4-gigahertz (GHz) frequency band has 14 channels, and a frequency bandwidth of each channel maybe 22 megahertz (MHz).

The frequency band includes but is not limited to a millimeter-wave frequency band and sub-6 GHz. A millimeter wave is an electromagnetic wave with a wavelength ranging from 1 millimeter to 10 millimeters (mm), and the millimeter-wave frequency band is 30 GHz to 300 GHz. Sub-6 GHz refers to an electromagnetic wave with a frequency band lower than 6 GHz. The millimeter-wave frequency band can provide a bandwidth higher than sub-6 GHz. Therefore, the millimeter-wave frequency band is featured in a high bandwidth, a highly integrated antenna array, and the like, and can implement a higher throughput.

A path loss exists in propagation of the electromagnetic wave. A higher frequency band used for transmitting a signal indicates a larger path loss. Therefore, a path loss of the millimeter-wave frequency band is also larger. Therefore, to improve signal quality, transmit power of a signal may be increased. For example, a single-carrier offset quadrature amplitude modulation (SC-OQAM) technology may be selected to generate a waveform with a low PAPR. For ease of description, the waveform generated by using the SC-OQAM technology is referred to as an SC-OQAM waveform or an SC-OQAM signal below.

(3) PAPR: is a ratio of peak power of a signal in one period to average power of the signal in the period.

The signal is a sine wave with changing amplitude in time domain. Peak power and average power of an amplitude of a signal in one period may be different from peak power and average power of an amplitude of a signal in another period, that is, a PAPR in one period may be different from a PAPR in another period.

A transmitting end is provided with a power amplifier, and the power amplifier amplifies power of a signal within a specified range. If the amplified power exceeds the specified range, the signal is distorted, and a receiving end cannot correctly parse the distorted signal. Therefore, to ensure that the peak power of the signal is within the specified range of the power amplifier, the average power of the signal may be reduced, but this causes low efficiency of the power amplifier, or a smaller equivalent coverage area of the signal. To meet a signal coverage area requirement, a technology with a low PAPR, for example, an SC-OQAM technology, may be selected.

It may be understood that a technology used for generating a signal is not limited in embodiments of this application, and a signal transmission method provided in this application may also be used for another technology different from the SC-OQAM technology. For example, the another technology may be a technology that can be used to generate a low PAPR.

(4) Phase noise (PHN): is a random phase offset generated for a signal in time domain. A higher frequency band indicates greater impact of phase noise on a signal, that is, the phase noise causes poorer signal demodulation performance. In the following description, the phase noise is briefly referred to as phase noise. In a period, a phase may indicate a location of a signal, and the phase is usually represented by an angle.

In new radio (NR), a phase tracking reference signal (PTRS) is introduced for a cyclic prefix (CP)-orthogonal frequency division multiplexing (OFDM) signal and a discrete Fourier transform (DFT)-spread (spread, s)-OFDM signal. The PTRS can compensate for the phase noise, and improve signal demodulation performance in a phase noise condition.

(5) Data signal: may be encoded data or unencoded data. The data signal may be located at a location of an even index, or may be located at a location of an odd index. The data signal maybe understood as a signal carrying data.

In this application, optionally, the data signal may be optionally a complex signal. For example, the complex signal may include at least one of the following: a real data signal and an imaginary data signal, where the real data signal is a real part signal of the data signal, and the imaginary data signal is an imaginary part signal of the data signal.

A location of the real data signal is a real signal location, that is, a location of a waveform used to carry the real data signal is the real signal location. A location of the imaginary data signal is an imaginary signal location, that is, a location of a waveform used to carry the imaginary data signal is the imaginary signal location.

For example, the real signal location is a location of an even index, and the imaginary signal location is a location of an odd index. For another example, the real signal location is a location of an odd index, and the imaginary signal location is a location of an odd index.

The term "and/or" in this application describes an association relationship for describing associated objects and represents that three relationships may exist. For example, A and/or B may represent the following three cases: Only A exists, both A and B exist, and only B exists. The character "/" usually indicates an "or" relationship between the associated objects.

In this application, "at least one" means one or more, and "a plurality of" means two or more.

In addition, it should be understood that in description of this application, terms such as "first" and "second" are merely used for distinguishing and description, but should not be understood as indicating or implying relative importance, or should not be understood as indicating or implying a sequence.

The technical solutions in embodiments of this application may be applied to a wireless communication system. For example, the wireless communication system may be a 4th generation (4G) communication system (for example, a long term evolution (LTE) system), a 5th generation (5G) communication system (for example, an NR system), or a future mobile communication system. The technical solutions in embodiments of this application may also be applied to a satellite communication system, where the satellite communication system may be integrated with the wireless communication system.

Figure 2:
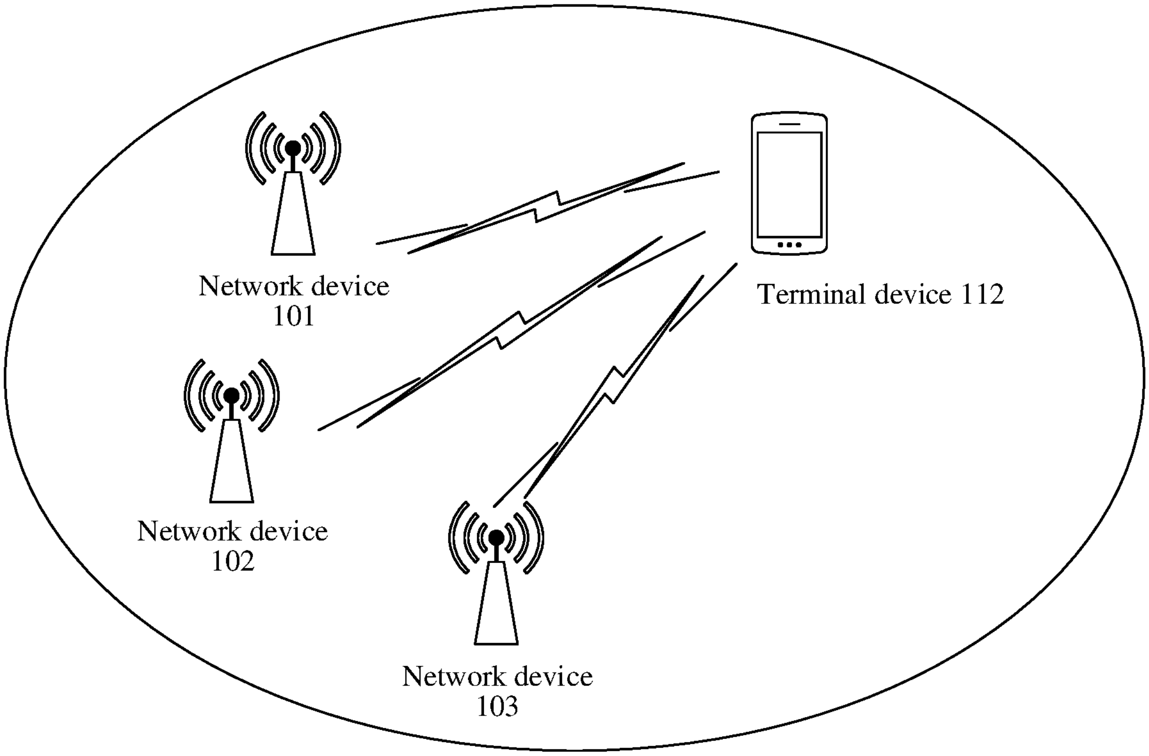
FIG. 2 is a schematic diagram of an architecture of a communication system.

The communication system provided in embodiments of this application is applicable to communication between a network device and a terminal device. The communication system may include one or more network devices and one or more terminal devices. For example, as shown in FIG. 1, the communication system may include one network device (for example, a network device 100) and a plurality of terminal devices (for example, a terminal device 110 and a terminal device 111). For another example, as shown in FIG. 2, the communication system may include a plurality of network devices (for example, a network device 101, a network device 102, and a network device 103) and one terminal device (for example, a terminal device 112). The communication system in embodiments of this application is also applicable to communication between network devices, communication between terminal devices, communication between the internet of vehicles, the internet of things, and the industrial internet, and the like.

Optionally, the network device in embodiments of this application is a device that connects the terminal device and a wireless network. The network device may be a node in a radio access network, and may also be referred to as a base station, or may be referred to as a radio access network (RAN) node (or device). For example, the network device may include an evolved NodeB (NodeB or eNB or eNodeB) in an LTE system or an LTE-advanced (LTE-A) system, for example, a conventional macro base station eNB and a micro base station eNB in a heterogeneous network scenario, or may include a next generation NodeB (gNB) in a 5G NR system, or may include a transmission reception point (TRP), a home base station (for example, a home evolved NodeB, or a home NodeB, HNB), a baseband unit (BBU), a baseband unit pool BBU pool, a wireless fidelity (Wi-Fi) access point (AP), or the like, or may include a central unit (CU) and a distributed unit (DU) in a cloud access network (Cloud RAN) system, or may include a network device in a non-terrestrial network (NTN), in other words, may be deployed on a high-altitude platform or a satellite. In the NTN, the network device maybe used as a layer 1 (Li) relay, or may be used as a base station, or may be used as a DU, or may be used as an integrated access and backhaul (JAB) node. This is not limited in embodiments of this application. Certainly, the network device may also be a node in a core network.

Optionally, the terminal device in embodiments of this application may be a device configured to implement a wireless communication function, for example, a terminal or a chip that may be used in the terminal. The terminal may be user equipment (UE), an access terminal, a terminal unit, a terminal station, a mobile station, a mobile console, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a virtual reality (VR) terminal device, an augmented reality (AR) terminal device, a wireless terminal in industrial control (industrial control), a wireless terminal in self driving, a wireless terminal in remote medical, a wireless terminal in smart grid, a wireless terminal in transportation safety, a wireless terminal in smart city, a wireless terminal in smart home, or the like. Alternatively, the terminal may be a terminal (for example, an internet of vehicles device) in vehicle-to-everything (V2X), a terminal in device-to-device communication, a terminal in machine-to-machine (M2M) communication, or the like. The terminal may be mobile or fixed.

The following describes an SC-OQAM technology.

Figure 3:
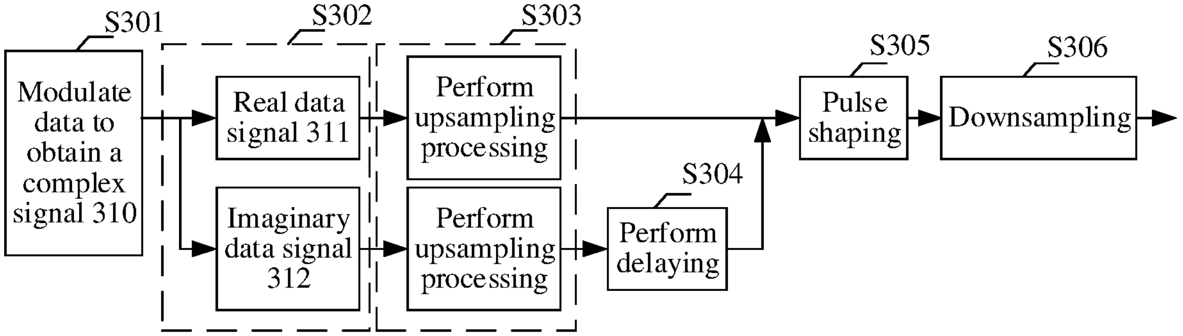
FIG. 3 is a schematic diagram of a time domain processing procedure.

FIG. 3 is a possible schematic diagram of a time domain processing procedure in an SC-OQAM technology.

In S301, a transmitting end modulates data to obtain a modulation signal, where the modulation signal is a complex signal 310, and the modulation signal includes one or more modulation symbols.

Figure 4:
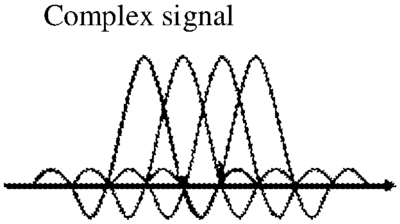
FIG. 4 is a schematic diagram of a waveform of a complex signal.

A possible waveform of the complex signal is shown in FIG. 4. One waveform carries one complex signal, and two waveforms are orthogonal. In other words, an amplitude of one waveform at a sampling point of a signal carried in a next waveform is 0.

In S302, the transmitting end separates a real part and an imaginary part of the complex signal 310 to obtain a real data signal 311 and an imaginary data signal 312.

In S303, the transmitting end performs upsampling processing on the real data signal 311 to obtain a real data signal 313, and performs upsampling processing on the imaginary data signal 312 to obtain an imaginary data signal 314.

For example, the transmitting end performs double upsampling on the real data signal 311, to obtain a real data signal 313, that is, [X, 0, X, 0, X, 0, . . . ]; and performs double upsampling on the imaginary data signal 312, to obtain an imaginary data signal 314, that is, [jY, 0, jY, 0, jY, 0, . . . ].

In S304, the transmitting end delays (also referred to as offsets) the real data signal 313 or the imaginary data signal 314.

For example, the transmitting end delays the imaginary data signal 314 to obtain an imaginary data signal 315, that is, [0, jY, 0, jY, 0, jY, . . . ].

A data signal 316 obtained by combining the real data signal 313 and the imaginary data signal 315 is [X, jY, X, jY, X, jY, . . . ].

In S305, the transmitting end uses a shaping filter to perform pulse shaping on the data signal 316 obtained through the combination.

Pulse shaping can reduce a PAPR of a signal, limit a transmission bandwidth required by the signal, and reduce or eliminate interference caused by the signal.

In S306, the transmitting end performs downsampling on a data signal obtained through pulse shaping, where a downsampled signal may be transmitted to a radio frequency module, and is sent to a receiving end through an antenna.

Figure 5:
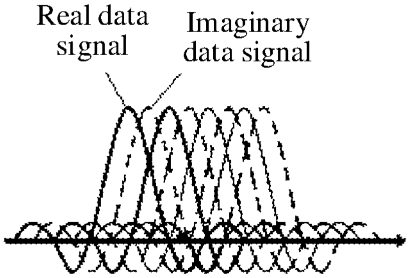
FIG. 5 is a schematic diagram of waveforms of a real data signal and an imaginary data signal.

After the real part and the imaginary part of the complex signal are separated, an orthogonal relationship between complex signals in FIG. 4 becomes a partial orthogonal relationship between a real data signal and an imaginary data signal, and the partial orthogonal relationship is partially interfered. A possible waveform of the real data signal and a possible waveform of the imaginary data signal are shown in FIG. 5. A waveform shown by a solid line carries the real data signal, and a waveform shown by a dashed line carries the imaginary data signal. Waveforms carrying real data signals are in an orthogonal relationship. The waveform carrying the real data signal and the waveform carrying the imaginary data signal are in a non-orthogonal relationship, and are interfered with each other. To be specific, an amplitude of the waveform carrying the real data signal at a sampling point of the (adjacent) waveform carrying the imaginary data signal is not 0, and an amplitude of the waveform carrying the imaginary data signal at a sampling point of the (adjacent) waveform carrying the real data signal is not 0. A real data signal sent at a real signal location causes real interference to an imaginary data signal sent at an imaginary signal location, and the imaginary data signal causes imaginary interference to the real data signal. In this way, when receiving the real data signal, the receiving end may discard the imaginary data signal, that is, eliminate interference caused by the imaginary data signal to the received real data signal; and when receiving the imaginary data signal, the receiving end may discard the real data signal, that is, eliminate interference caused by the real data signal to the received imaginary data signal. Therefore, the receiving end may correctly receive and process data. It can be learned that a non-wave peak of the waveform of the imaginary data signal is superimposed on a wave peak of the waveform of the real data signal. Such a wave peak staggering processing manner can reduce a PAPR.

Figure 6:
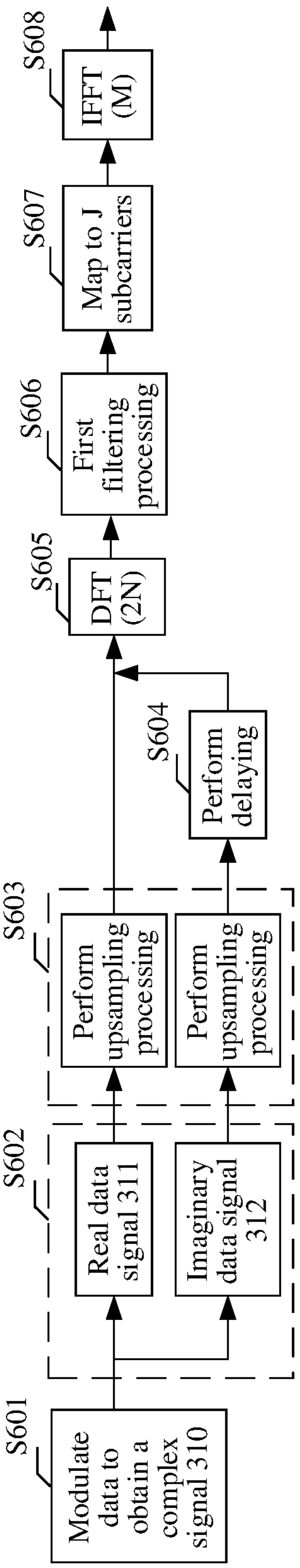
FIG. 6 is a schematic diagram of a frequency domain processing procedure.

FIG. 6 is a possible schematic diagram of a frequency domain processing procedure in an SC-OQAM technology.

For a process of S601 to S604, refer to S301 to S304.

The complex signal 310 has N points, and a data signal 316 obtained through combination has 2N points. In other words, a length of the data signal 316 is twice that of the complex signal 310.

In S605, the transmitting end performs 2N-point discrete Fourier transform (discrete Fourier transform, DFT) processing on the data signal 316.

Optionally, in S606, the transmitting end performs, by using a filter, first filtering processing on a data signal obtained through the DFT processing, to obtain a data signal 317. For example, a quantity of points of the data signal 317 may be J, where J is greater than or equal to N, and J is less than or equal to 2N. It should be noted that second filtering processing may be performed on a data signal obtained through DFT or existing before DFT, to generate an interference signal. That is, the real data signal generates interference at an imaginary signal location, and the imaginary data signal generates interference at a real signal location. The second filtering processing may be the same as or different from the first filtering processing. The interference signal in the following description may be generated by performing second filtering processing on the data signal obtained through the DFT or existing before the DFT.

Because a quantity of points of DFT in S605 is twice a quantity of points of the complex signal 310, data obtained through the DFT processing is redundant. Therefore, frequency-domain filtering may be performed on the redundant signal, and no performance loss is caused.

In S607, the transmitting end maps the data signal 317 to J subcarriers.

In S608, the transmitting end adds zero to the data signal on the J subcarriers, performs M-point inverse fast Fourier transform (IFFT), adds a CP, and sends the data signal to the receiving end.

Herein, after a real part and an imaginary part of the complex signal are separated, a wave peak of the real data signal and a wave peak of the imaginary data signal are staggered, so that a PAPR can be reduced.

A problem such as phase noise may further exist in propagation of an electromagnetic wave, and therefore performance of a communication system is deteriorated or even the communication system cannot work. Therefore, phase noise may be estimated, to ensure performance of the communication system.

Figure 7:
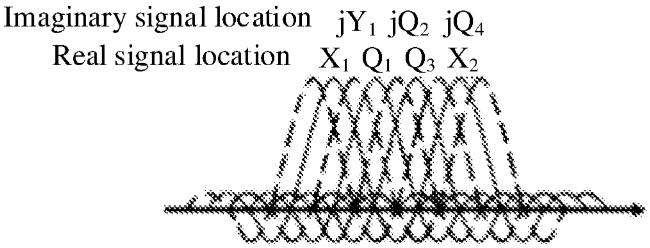
FIG. 7 is a schematic diagram of waveforms of a real data signal and an imaginary data signal.

In a possible manner, phase noise may be estimated based on a low-PAPR waveform shown in FIG. 3 or FIG. 6. For example, a reference signal is inserted based on a data signal. As shown in FIG. 7, a real signal location includes real data signals $X_1$ and $X_2$, an imaginary signal location includes an imaginary data signal $jY_1$, real reference signals $Q_1$ and $Q_3$ are inserted at the real signal location, and imaginary reference signals $jQ_2$ and $jQ_4$ are inserted at the imaginary signal location.

Signal $Z_1$ at the imaginary signal location=($jQ_1$+INT), where $jQ_1$ refers to an imaginary data signal or an imaginary reference signal at the imaginary signal location, and INT refers to a real interference signal. For example, the real interference signal INT of the imaginary data signal $jY_1$ includes the real data signals $X_1$ and $X_2$ and the real reference signals $Q_1$ and $Q_3$, that is, the imaginary signal location is interfered with by a signal sent at the real signal location.

Signal $Z_Q$ at the real signal location=($Q_Q$+jINT), where $Q_Q$ refers to a real data signal or a real reference signal at the real signal location, and jINT refers to an imaginary interference signal. For example, the imaginary interference signal jINT of the real reference signal $Q_1$ includes the imaginary data signal $jY_1$ and the imaginary reference signals $jQ_2$ and $jQ_4$, that is, the real signal location is interfered with by a signal sent at the imaginary signal location.

The receiving end may extract an imaginary part from a received signal at the imaginary signal location, and extract a real part from a received signal at the real signal location, so that the receiving end can correctly receive the signal. However, due to the phase noise, the signal (for example, $jQ_1$ or $Q_Q$) and the interference signal (for example, INT or jINT) are no longer orthogonal. For example, Signal $Z_Q$=($Q_Q$+jINT) is affected by the phase noise and becomes $Z_Q$=($Q_Q$+jINT)*exp(1i*Θ), where Θ is the phase noise, and the phase noise may cause some energy of INT to become an imaginary number. Consequently, $Q_Q$ and jINT are crossed but not orthogonal, and correct receiving of a signal at the receiving end is affected.

For example, values of $Q_1$ and $Q_3$ may be designed, so that interference to $jQ_2$ and $jQ_4$ is 0. In this way, Signal Z at an imaginary signal location of $jQ_2$=$jQ_2$*exp(1i*Θ), and signal Z at an imaginary signal location of $jQ_4$=$jQ_4$*exp (1i*Θ). Because $jQ_2$ and $jQ_4$ are known reference signals, the phase noise Θ may be estimated, to reduce interference caused by the interference signal to the data. Herein, $Q_1$ and $Q_3$ are used to eliminate interference of $jQ_2$ and $jQ_4$, do not participate in a phase noise estimation process, and cannot be used to transmit data. $Q_1$ and $Q_3$ are redundant signals. Therefore, phase noise estimation precision of a PTRS designed herein is low, and the PTRS has extra overheads.

Based on this, an embodiment of this application further provides a signal transmission method, which may be applied to the communication system shown in FIG. 1 or FIG. 2. A first signal sent by the transmitting end includes a data signal and a reference signal; a first imaginary reference signal in the reference signal is located at a real signal location of the first signal, and/or a first real reference signal in the reference signal is located at an imaginary signal location of the first signal; and the reference signal is used for phase noise estimation. In this way, phase noise estimation precision can be improved, and signal overheads can be reduced. The first signal maybe a PTRS.

The first signal may include a data signal. For example, the data signal may be located at a location of an even index of the first signal, or the data signal may be located at a location of an odd index of the first signal, or is not limited to a location index. For example, the data signal may be located at both the location of the odd index of the first signal and the location of the even index of the first signal. For example, the first signal may be [$C_1$, $C_2$, $C_3$, . . . ], that is, each location of the first signal includes data signals $C_1$, $C_2$, $C_3$, and the like. For another example, the data signal is optionally a complex signal, and the data signal may include a real data signal and/or an imaginary data signal. The real data signal may be located at a real signal location of the first signal, and the imaginary data signal may be located at an imaginary signal location of the first signal. The real signal location may be a location of an even index, and the imaginary signal location is a location of an odd index. Alternatively, the real signal location may be a location of an odd index, and the imaginary signal location is a location of an even index (the following mainly uses this case as an example for description). For example, Data signal C=X+jY, where when X is 0, the data signal includes an imaginary data signal, when Y is 0, the data signal includes a real data signal, and when X is not 0 and Y is not 0, the data signal includes a real data signal and an imaginary data signal. The first signal may be [$X_1$, $jY_1$, $X_2$, $jY_2$, $X_3$, $jY_3$, . . . ], the real signal location of the first signal includes the real data signals $X_1$, $X_2$, $X_3$, and the like, and the imaginary signal location of the first signal includes the imaginary data signals $jY_1$, $jY_2$, $jY_3$, and the like. It should be noted that, in this embodiment of this application, for example, double upsampling and delaying are mainly performed on the real data signal and the imaginary data signal. For a case in which more reference signals are inserted, more than double upsampling and delaying may be performed on the real data signal and the imaginary data signal. This is not limited herein.

In this embodiment of this application, phase noise estimation is implemented by inserting a reference signal. Descriptions are provided below separately by using a plurality of possible cases such as inserting a first real reference signal and/or a first imaginary reference signal, inserting a second real reference signal and/or a second imaginary reference signal, and a multi-user case as examples.

Figure 8:
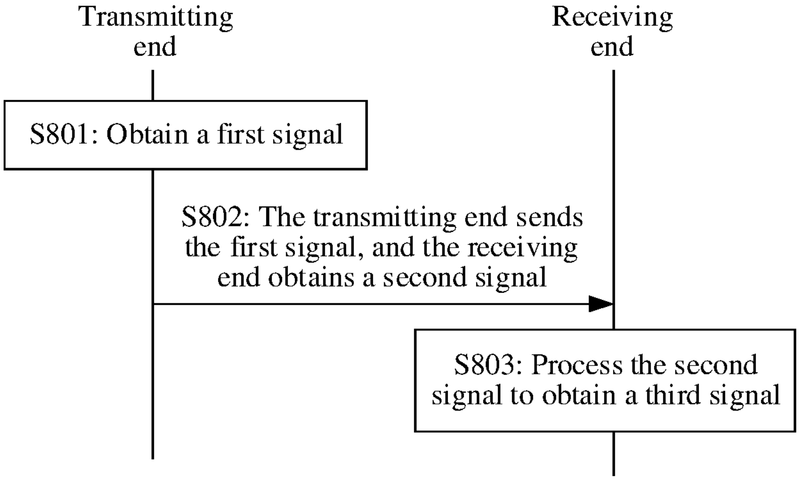
FIG. 8 is a schematic diagram of a signal transmission process according to an embodiment of this application.

Embodiment 1: The first signal includes a first imaginary reference signal, and the first imaginary reference signal is located at a real signal location, that is, the first imaginary reference signal is inserted at the real signal location. FIG. 8 shows a possible signal transmission process. The process includes the following steps.

S801: A transmitting end obtains a first signal.

In S801, the transmitting end may generate the first signal, or the transmitting end may obtain the first signal from another device (the first signal is generated by the another device, and the transmitting end may receive the first signal sent by the another device). In this embodiment of this application, that the transmitting end generates the first signal is mainly used for description. A process in which another device generates the first signal is similar to a process in which the transmitting end generates the first signal. Details are not described again.

The first signal includes a data signal, and the first signal may further include M reference signals. The M reference signals are used for phase noise estimation, and M is an integer greater than 0, that is, M=1, 2, 3, . . . . In this embodiment, the M reference signals include M1 first imaginary reference signals, M=M1, and M is an integer greater than 0. The M1 first imaginary reference signals are located at a real signal location of the first signal. In other words, the transmitting end may insert (or set) the M1 first imaginary reference signals at the real signal location of the first signal. Optionally, real signal locations (or indexes of the real signal locations) of the M1 first imaginary reference signals maybe consecutive or inconsecutive. Optionally, the M reference signals may be obtained by processing the data signal.

In an example, when a number of a port used by the transmitting end to send the first signal is an odd number (or an even number), the first signal may include the M1 first imaginary reference signals. In another example, when an identifier of a receiving end (that is, a device that obtains or receives the first signal) is an odd number (or an even number), the first signal may include the M1 first imaginary reference signals. In still another example, the transmitting end processes the data signal to determine the M1 first imaginary reference signals in the M reference signals.

Figure 9:
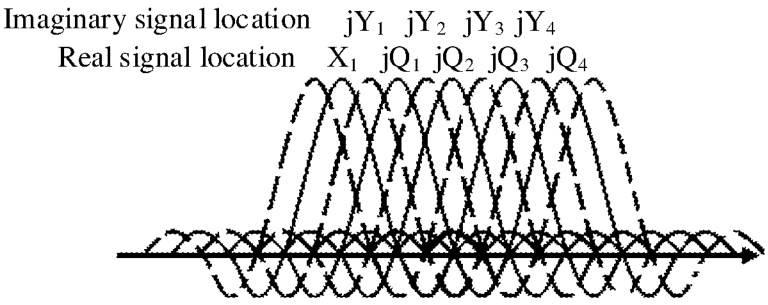
FIG. 9 is a schematic diagram of a signal waveform according to an embodiment of this application.

For example, the M reference signals include the M1 first imaginary reference signals. As shown in FIG. 9, the first signal may be $[X_1, jY_1, jQ_1, jY_2, jQ_2, jY_3, jQ_3, jY_4, jQ_4, \ldots]$, a real signal location of the first signal includes the real data signal $X_1$ and the first imaginary reference signals $jQ_1$, $jQ_2$, $jQ_3$, $jQ_4$, and the like, and an imaginary signal location of the first signal includes the imaginary data signals $jY_1$, $jY_2$, $jY_3$, $jY_4$, and the like.

The transmitting end and the receiving end know an amplitude of a reference signal. Optionally, the amplitude of the reference signal maybe a fixed value. Usually, the amplitude is an absolute value. For example, amplitudes of the M1 first imaginary reference signals are a first preset value, where the first preset value is random. This is not limited in this embodiment of this application.

A polarity of the reference signal may represent positive and negative of the amplitude. Optionally, the transmitting end may adjust the polarity of the reference signal. The polarity of the reference signal may be related to one or more of the following information: a polarity of an interference signal to the reference signal, a polarity of an adjacent signal of the reference signal, a polarity of the data signal, a polarity of the reference signal, an identifier of the transmitting end, an identifier of the receiving end, a port number of the transmitting end, a signal value of the reference signal, a signal value of the interference signal, and a signal value of the interference signal superimposed on the reference signal. In embodiments of this application, unless otherwise specified, the signal value may be an absolute value (for example, an amplitude) of the signal, or maybe a value with positive and negative polarities (for example, an amplitude with a polarity).

Signal interference at an imaginary signal location exists at a real signal location, that is, the signal at the real signal location interferes with the signal at the imaginary signal location, that is, the signal at the imaginary signal location is interfered with by the signal at the real signal location. For example, the imaginary data signals $jY_1$, $jY_2$, $jY_3$, and $jY_4$ in FIG. 9 interfere with the first imaginary reference signal $jQ_1$. Optionally, an interference signal of the reference signal may include an interference signal caused by the data signal to the reference signal, and/or an interference signal caused by another reference signal to the reference signal. For the first imaginary reference signal, the another reference signal may include a first real reference signal (if existent) and/or a second imaginary reference signal (if existent) at the imaginary signal location. For descriptions of the first real reference signal and the second imaginary reference signal, refer to the following embodiments. In the first signal shown in FIG. 9, Signal Z1 at a location of $jQ_1=j(Q_1+INT1)$, where jINT1 is imaginary interference at the location of $jQ_1$, Signal Z2 at a location of $jQ_2=j(Q_2+INT2)$, where jINT2 is imaginary interference at the location of $jQ_2$, Signal Z3 at a location of $jQ_3=j(Q_3+INT3)$, where jINT3 is imaginary interference at the location of $jQ_3$, and Signal Z4 at a location of $jQ_4=j(Q_4+INT4)$, where jINT4 is imaginary interference at the location of $jQ_4$.

When a polarity of the reference signal is related to a polarity of an interference signal to the reference signal, the polarity of the reference signal may be the same as or opposite to the polarity of the interference signal to the reference signal. For example, a polarity of the first imaginary reference signal may be the same as (or opposite to) a polarity of an interference signal of the first imaginary reference signal. In an example, the transmitting end may determine the polarity of the first imaginary reference signal based on a polarity of a data signal that interferes with the first imaginary reference signal. In another example, the transmitting end may determine the polarity of the first imaginary reference signal based on a polarity of a second imaginary reference signal that interferes with the first imaginary reference signal. In still another example, when a signal value of an interference signal to the reference signal is 0, the polarity of the reference signal may be positive, or may be negative, or may not be specified.

When the polarity of the reference signal is related to a polarity of an adjacent signal of the reference signal, the polarity of the reference signal may be the same as or opposite to the polarity of the adjacent signal of the reference signal. Optionally, the adjacent signal of the reference signal may include a data signal and/or a reference signal. "Adjacent" may include "adjacent" before a location of a reference signal (that is, front-adjacent), and/or "adjacent" after the location of the reference signal (that is, rear-adjacent). If indexes of signal locations are in ascending order, an index of a location of a front-adjacent signal is less than an index of the location of the reference signal, and an index of a location of a rear-adjacent signal is less than the index of the location of the reference signal. "Adjacent" may refer to an adjacent signal location (not limited to a real signal location or an imaginary signal location) in time domain. Indexes of locations of adjacent signals and indexes of locations of reference signals maybe consecutive. For example, adjacent signals of $jQ_1$ in FIG. 9 may be $jY_1$ and $jY_2$. Alternatively, "adjacent" may refer to an adjacent real signal location in time domain. An index of a location of an adjacent signal is separated from an index of a location of a reference signal by an index of an imaginary signal location. For example, adjacent signals of $jQ_1$ in FIG. 9 may be $X_1$ and $jQ_2$. Alternatively, "adjacent" may refer to an adjacent imaginary signal location in time domain. An index of a location of an adjacent signal is separated from an index of a location of a reference signal by an index of a real signal location. For example, an adjacent signal of $jY_1$ in FIG. 9 may be $jY_2$. The adjacent signals of the reference signal may include adjacent signals before the location of the reference signal, and/or adjacent signals after the location of the reference signal. For example, a polarity of the first imaginary reference signal is the same as or opposite to a polarity of an adjacent first imaginary reference signal.

Optionally, if the first imaginary reference signal is adjacent to two imaginary data signals, the two imaginary data signals may have a same amplitude and opposite polarities. For example, the two imaginary data signals are jD and −jD respectively. If the first imaginary reference signal is adjacent to two real data signals, the two real data signals may have a same amplitude and opposite polarities. For example, the two real data signals are D and −D respectively.

When the polarity of the reference signal is related to a polarity of a data signal, the polarity of the reference signal maybe the same as or opposite to the polarity of the data signal. In an example, the data signal includes a real data signal and an imaginary data signal, and a polarity of the first imaginary reference signal may be the same as (or opposite to) a polarity of an imaginary data signal adjacent to the first imaginary reference signal.

When the polarity of the reference signal is related to a polarity of the reference signal, the polarity of the reference signal may be the same as or opposite to the polarity of the adjacent reference signal. In an example, a polarity of the first imaginary reference signal is the same as (or opposite to) a polarity of an adjacent first imaginary reference signal.

If the polarity of the reference signal is related to an identifier of the receiving end, when the identifier of the receiving end is an odd number, the polarity of the first imaginary reference signal may be positive (or negative), or when the identifier of the receiving end is an even number, the polarity of the first imaginary reference signal may be negative (or positive). Optionally, the identifier of the receiving end may be a UE number (ID). Optionally, the M1 first imaginary reference signals may be inserted when the identifier of the receiving end is an odd number (or an even number). The receiving end is a device that receives the first signal.

If the polarity of the reference signal is related to the identifier of the transmitting end, when the identifier of the transmitting end is an odd number, the polarity of the first imaginary reference signal may be positive (or negative), and when the identifier of the transmitting end is an even number, the polarity of the first imaginary reference signal maybe negative (or positive). Optionally, the identifier of the receiving end maybe a UE ID. Optionally, the M1 first imaginary reference signals may be inserted when the identifier of the transmitting end is an odd number (or an even number). The transmitting end is a device that sends the first signal.

If the polarity of the reference signal is related to the port number of the transmitting end, when the port number of the transmitting end is an odd number, the polarity of the first imaginary reference signal may be positive (or negative), or when the port number of the transmitting end is an even number, the polarity of the first imaginary reference signal may be negative (or positive).

For a case in which the polarity of the reference signal is related to the signal value of the interference signal superimposed on the reference signal, refer to the following embodiments. The interference signal superimposed on the reference signal may include one or more of a data signal, a first real reference signal (if existent), or a second imaginary reference signal (if existent) at an imaginary signal location.

For a case in which the polarity of the reference signal is related to the signal value of the reference signal, and a case in which the polarity of the reference signal is related to the signal value of the interference signal, refer to the case in which the polarity of the reference signal is related to the signal value of the interference signal superimposed on the reference signal.

Optionally, a power value of the first signal is greater than a specified power threshold. The power threshold may be configured by a network device, specified in a protocol, or reported by a terminal device. Alternatively, the power threshold may be related to a modulation mode or a modulation and coding scheme.

It should be noted that both "amplitude" and "polarity" in embodiments of this application may be configured by the network device, or reported by the terminal device, or agreed on by the network device and the terminal device, or specified in a protocol. This is not limited in embodiments of this application.

Figure 10:
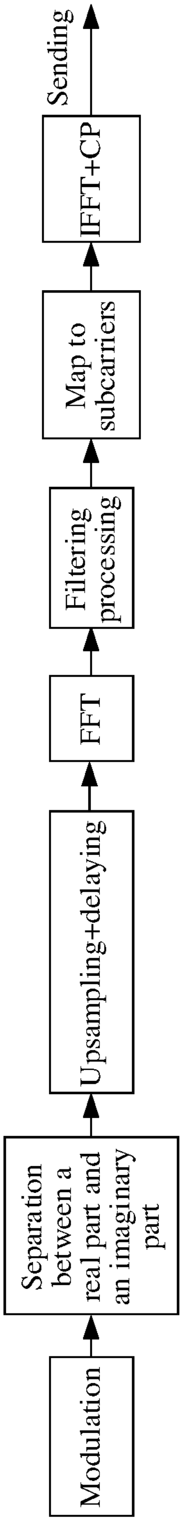
FIG. 10 is a schematic flowchart of processing at a transmitting end according to an embodiment of this application.

In S801, a process in which the transmitting end generates the first signal may be shown in FIG. 10. The transmitting end modulates data to obtain a modulation signal, where the modulation signal includes one or more modulation symbols, and the modulation signal is a negative signal. The transmitting end separates a real part and an imaginary part of the modulation signal to obtain a real data signal and an imaginary data signal. The transmitting end performs upsampling processing and delaying on the real data signal or the imaginary data signal, and inserts the first imaginary reference signal. Then, the transmitting end performs fast Fourier transform (FFT) on the processed signal, converts a time domain signal into a frequency domain signal, performs filtering processing (for example, the foregoing first filtering processing and/or second filtering processing) on the frequency domain signal, and then maps the frequency domain signal to a subcarrier used to send the frequency domain signal. The transmitting end performs inverse fast Fourier transform (IFFT) on the frequency domain signal, converts the frequency domain signal into a time domain signal, adds a cyclic prefix to obtain a baseband signal, and finally sends the baseband signal to a radio frequency for sending. The first signal may be a signal obtained when the transmitting end inserts the first imaginary reference signal, or the first signal may be the baseband signal.

S802: The transmitting end sends the first signal, and the receiving end obtains a second signal.

In S802, the transmitting end sends the first signal on a channel, and correspondingly, the receiving end attempts to obtain (or receive) the first signal on the channel. However, due to interference such as signal noise and noise, the second signal obtained by the receiving end is a received signal obtained when noise is superimposed on the first signal after the first signal passes through a channel.

Optionally, before sending the first signal, the transmitting end may further perform other processing on the first signal. This is not limited in this embodiment of this application. For example, the first signal is a signal obtained when the first imaginary reference signal is inserted in FIG. 10, and the transmitting end may further perform processing such as FFT, filtering processing, and IFFT on the first signal.

S803: The receiving end processes the second signal to obtain a third signal.

A process in which the receiving end processes the second signal may be reverse operation processing of generating the first signal, to estimate the phase noise.

Figure 11:
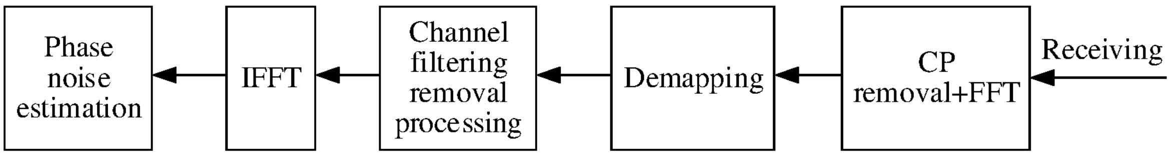
FIG. 11 is a schematic flowchart of processing at a receiving end according to an embodiment of this application.

The process in which the receiving end processes the second signal may be shown in FIG. 11. The receiving end removes a cyclic prefix of the obtained second signal, performs FFT, changes a time domain signal into a frequency domain signal, and then performs subcarrier demapping. The transmitting end performs channel filtering removal processing, performs IFFT, converts the frequency domain signal into a time domain signal, and then performs phase noise estimation. The transmitting end obtains the third signal after removing the phase noise and noise.

The third signal may be the first signal, or may include the first signal. The third signal includes a data signal, and may further include M reference signals. The M reference signals are used for phase noise estimation. The M reference signals include M1 first imaginary reference signals, and the M1 first imaginary reference signals are located at a real signal location of the third signal.

The receiving end knows an amplitude of the reference signal, for example, amplitudes of the M1 first imaginary reference signals are a first preset value. The receiving end may estimate the polarity of the reference signal. For example, the polarity of the reference signal may be related to one or more of the following information: a polarity of an interference signal of the reference signal, a polarity of an adjacent signal of the reference signal, a polarity of a data signal, an identifier of the transmitting end, an identifier of the receiving end, a port number of the transmitting end, a signal value of the reference signal, a signal value of the interference signal, a signal value of the interference signal superimposed on the reference signal, and a polarity of a received signal (that is, the third signal). For example, the polarity of the reference signal may be the same as the polarity of the third signal. The receiving end is a device that receives the second signal/third signal, and the transmitting end is a device that receives the second signal/third signal.

Therefore, the receiving end can estimate the phase noise based on the known amplitude of the reference signal and the estimated polarity of the reference signal.

FIG. 9 is still used as an example. In consideration of impact of phase noise and noise, in the second signal received by the receiving end, Signal Z1' at a location of $jQ_1$=j(Q1+INT1)*exp(1i*Θ)+Noise, Signal Z2' at a location of $jQ_2$=j($Q_2$+INT2)*exp(1i*Θ)+Noise, Signal Z3' at a location of $jQ_3$=j($Q_3$+INT3)*exp(1i*Θ)+Noise, and Signal Z4' at a location of $jQ_4$=j($Q_4$+INT4)*exp(1i*Θ)+Noise, where Θ is the phase noise.

If the reference signals (such as $jQ_1$, $jQ_2$, $jQ_3$, and $jQ_4$) and the interference signals (such as jINT1, jINT2, jINT3, and jINT4) are all imaginary part signals, phases of Z1, Z2, Z3, and Z4 each may be 90 degrees or −90 degrees, and −90 degrees may also be referred to as 270 degrees. Because a phase offset is generated due to the phase nose, in S803, the receiving end may determine, based on a phase deviation between each of Z1', Z2', Z3', and Z4' and 90 degrees or −90 degrees, the phase offset generated due to the phase noise, that is, estimate the phase noise. Because the receiving end knows the amplitude and the estimated polarity of each first imaginary reference signal, the receiving end may estimate and eliminate interference that may be caused by each first imaginary reference signal.

Figure 12:
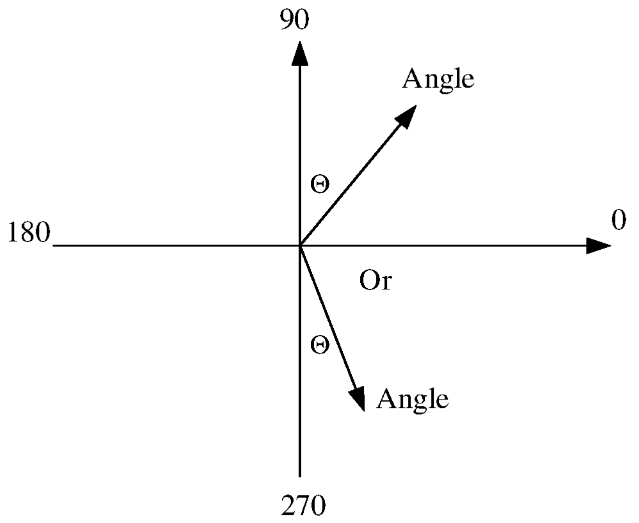
FIG. 12 is a schematic diagram of a signal phase according to an embodiment of this application.

Specifically, in a process of estimating the phase noise, the receiving end may first estimate an angle of a received signal, that is, estimate angles of Z1', Z2', Z3', and Z4'. When the impact of the noise and the phase noise is small, the impact of the noise and the phase noise on the signal is also small, and the estimated angle is accurate. When the polarity of the interference signal superimposed on the first imaginary reference signal is positive, an estimated angle (of the interference signal superimposed on the first imaginary reference signal) is approximately 90 degrees (is 90 degrees when there is no noise or phase noise). When the polarity of the interference signal superimposed on the first imaginary reference signal is negative, an estimated angle is approximately 270 degrees (is 270 degrees when there is no noise or phase noise). In a case of phase noise estimation, a high modulation order maybe set. In this way, a requirement on a signal-to-noise ratio is high, noise power is low, and impact on an angle is small (which maybe ignored). In addition, the phase noise is far less than 90 degrees, and therefore impact on an angle is also small. In this way, the signal may be estimated based on a range of the angle of the signal. As shown in FIG. 12, if the range of the angle of the signal is between 0 degrees and 180 degrees, and the polarity of the interference signal superimposed on the first imaginary reference signal is positive, a deviation between the angle of the signal and 90 degrees is the phase noise. If the range of the angle of the signal is between 180 degrees and 360 degrees, and the polarity of the interference signal superimposed on the first imaginary reference signal is negative, a deviation between the angle of the signal and 270 degrees is the phase noise.

Optionally, the following joint phase noise estimation manner may also be used: Z1, Z2, Z3, and Z4 are added in in-phase. For example, polarities of Z1 and Z3 are positive, polarities of Z2 and Z4 are negative, and the in-phase addition is Z1-Z2+Z3-Z4. The receiving end may estimate stronger signal energy, and noise power can be reduced by four times, so that phase noise estimation performance and accuracy can be further improved.

In Embodiment 1, the first imaginary reference signal is sent at the real signal location, and all the first imaginary reference signals may be used for phase noise estimation. Therefore, phase noise estimation performance and accuracy can be improved without requiring additional signaling overheads.

Embodiment 2: The first signal includes a first real reference signal, and the first real reference signal is located at an imaginary signal location, that is, the first real reference signal is inserted at the imaginary signal location.

A difference between this embodiment and S801 in Embodiment 1 lies in that, the M reference signals include M2 first real reference signals, M=M2, and M is an integer greater than 0. The M2 first real reference signals are located at an imaginary signal location of the first signal. In other words, the transmitting end may insert (or set) the M2 first real reference signals at the imaginary signal location of the first signal. Optionally, imaginary signal locations (or indexes of the imaginary signal locations) of the M2 first real reference signals may be consecutive or inconsecutive. Values of M1 and M2 may be the same or different. Optionally, the M reference signals may be obtained by processing the data signal. In this embodiment, a difference between Embodiment 2 and Embodiment 1 is mainly described. For a similarity, refer to Embodiment 1.

In an example, when a number of a port used by the transmitting end to send the first signal is an even number (or an odd number), the first signal may include the M2 first real reference signals. In another example, when an identifier of the receiving end is an even number (or an odd number), the first signal may include the M2 first real reference signals. In still another example, the transmitting end processes the data signal to determine the M2 first real reference signals in the M reference signals.

For example, the M reference signals include the M2 first real reference signals. The first signal may be [$X_1$, $jY_1$, $X_2$, $Q_1$, $X_3$, $Q_2$, $X_4$, $Q_3$, $X_5$, $Q_4$, . . . ], a real signal location of the first signal includes the real data signals $X_1$, $X_2$, $X_3$, $X_4$, $X_5$, and the like and the first real reference signals $Q_1$, $Q_2$, $Q_3$, $Q_4$, and the like, and an imaginary signal location of the first signal includes the imaginary data signal $jY_1$.

The transmitting end and the receiving end know an amplitude of a reference signal. For example, amplitudes of the M2 first real reference signals are a second preset value, where the second preset value is random, and the first preset value and the second preset value may be the same or different. This is not limited in this embodiment of this application.

Optionally, the transmitting end may adjust the polarity of the first real reference signal. The polarity of the first real reference signal may be related to one or more of the following information: a polarity of an interference signal to the reference signal, a polarity of an adjacent signal of the reference signal, a polarity of the data signal, an identifier of the transmitting end, a polarity of the reference signal, an identifier of the receiving end, a port number of the transmitting end, a signal value of the reference signal, a signal value of the interference signal, and a signal value of the interference signal superimposed on the reference signal. Optionally, for the receiving end, the polarity of the first real reference signal may also be related to the polarity of the received signal.

Signal interference at a real signal location exists at an imaginary signal location, that is, the signal at the real signal location interferes with the signal at the imaginary signal location, that is, the signal at the imaginary signal location is interfered with by the signal at the real signal location. Optionally, an interference signal of the reference signal may include an interference signal caused by the data signal to the reference signal, and/or an interference signal caused by another reference signal to the reference signal. For the first real reference signal, the another reference signal may include a first imaginary reference signal (if existent) and/or a second real reference signal (if existent) at the real signal location. For description of the second real reference signal, refer to the following embodiments. In the first signal at the transmitting end, Signal Z1 at a location of $Q_1=(Q_1+INT1)$, where INT1 is real interference at the location of $Q_1$, Signal Z2 at a location of $Q_2=(Q_2+INT2)$, where INT2 is real interference at the location of $Q_2$, Signal Z3 at a location of $Q_3=(Q_1+INT3)$, where INT3 is real interference at the location of $Q_3$, and Signal Z4 at a location of $Q_4=(Q_4+INT4)$, where INT4 is real interference at the location of $Q_4$.

When the polarity of the reference signal is related to the polarity of the interference signal to the reference signal, for example, the polarity of the first real reference signal may be the same as (or opposite to) a polarity of an interference signal of the first real reference signal. In an example, the transmitting end may determine the polarity of the first real reference signal based on a polarity of a data signal that interferes with the first real reference signal. In another example, the transmitting end may determine the polarity of the first real reference signal based on a polarity of a second real reference signal that interferes with the first real reference signal. In still another example, when a signal value of an interference signal to the reference signal is 0, the polarity of the reference signal may be positive, or may be negative, or may not be specified.

When the polarity of the reference signal is related to the polarity of the adjacent signal of the reference signal, for example, the polarity of the first real reference signal is the same as or opposite to a polarity of an adjacent first real reference signal.

Optionally, if the first real reference signal is adjacent to two real data signals, the two real data signals may have a same amplitude and opposite polarities. If the first real reference signal is adjacent to two imaginary data signals, the two imaginary data signals may have a same amplitude and opposite polarities.

When the polarity of the reference signal is related to the polarity of the data signal, in an example, the data signal includes a real data signal and an imaginary data signal, and the polarity of the first real data signal may be the same as (or opposite to) a polarity of a real data signal adjacent to the first real data signal.

When the polarity of the reference signal is related to a polarity of the reference signal, the polarity of the reference signal may be the same as or opposite to the polarity of the adjacent reference signal. In an example, a polarity of the first real reference signal is the same as (or opposite to) a polarity of an adjacent first real reference signal.

If the polarity of the reference signal is related to the identifier of the receiving end, when the identifier of the receiving end is an odd number, the polarity of the first real reference signal may be positive (or negative), or when the identifier of the receiving end is an even number, the polarity of the first real reference signal may be negative (or positive). Optionally, the identifier of the receiving end maybe a UE ID. Optionally, the M2 first real reference signals may be inserted when the identifier of the receiving end is an even number (or an odd number).

If the polarity of the reference signal is related to the identifier of the transmitting end, when the identifier of the transmitting end is an odd number, the polarity of the first real reference signal may be positive (or negative), or when the identifier of the transmitting end is an even number, the polarity of the first real reference signal may be negative (or positive). Optionally, the identifier of the transmitting end may be a UE ID. Optionally, the M2 first real reference signals may be inserted when the identifier of the transmitting end is an even number (or an odd number).

If the polarity of the reference signal is related to the port number of the transmitting end, when the port number of the transmitting end is an odd number, the polarity of the first real reference signal may be positive (or negative), or when the port number of the transmitting end is an even number, the polarity of the first real reference signal may be negative (or positive).

For a case in which the polarity of the reference signal is related to the signal value of the interference signal superimposed on the reference signal, refer to the following embodiments. The interference signal superimposed on the reference signal may include one or more of a data signal, a first imaginary reference signal (if existent), or a second real reference signal (if existent) at an imaginary signal location.

A difference between this embodiment and S803 in Embodiment 1 lies in that, the third signal obtained by processing the received second signal by the receiving end includes a data signal, and may further include M reference signals, where the M reference signals are used for phase noise estimation, the M reference signals include M2 first real reference signals, and the M2 first real reference signals are located at an imaginary signal location of the third signal.

The receiving end may estimate the phase noise based on the known amplitude of the reference signal and the estimated polarity of the reference signal.

The foregoing description is still used as an example. In consideration of impact of phase noise and noise, in the second signal received by the receiving end, Signal Z1'at a location of $Q1=(Q1+INT1)*\exp(1i*\Theta)+Noise$, Signal Z2' at a location of $Q_2=(Q_2+INT2)*\exp(1i*\Theta)+Noise$, Signal Z3' at a location of $Q_3=(Q_3+INT3)*\exp(1i*\Theta)+Noise$, and Signal Z4' at a location of $Q_4=(Q_4+INT4)*\exp(1i*\Theta)+Noise$, where O is the phase noise.

If the reference signals (such as $Q_1$, $Q_2$, $Q_3$, and $Q_4$) and the interference signals (such as INT1, INT2, INT3, and INT4) are all real part signals, phases of Z1, Z2, Z3, and Z4 each may be 0 degrees or 180 degrees. Because a phase offset is generated due to the phase nose, in S803, the receiving end may determine, based on a phase deviation between each of Z1', Z2', Z3', and Z4' and approximately 0 degrees or 180 degrees, the phase offset generated due to the phase noise, that is, estimate the phase noise. Because the receiving end knows the amplitude and the estimated polarity of each first imaginary reference signal, the receiving end may estimate and eliminate interference that may be caused by each first real reference signal.

Figure 13:
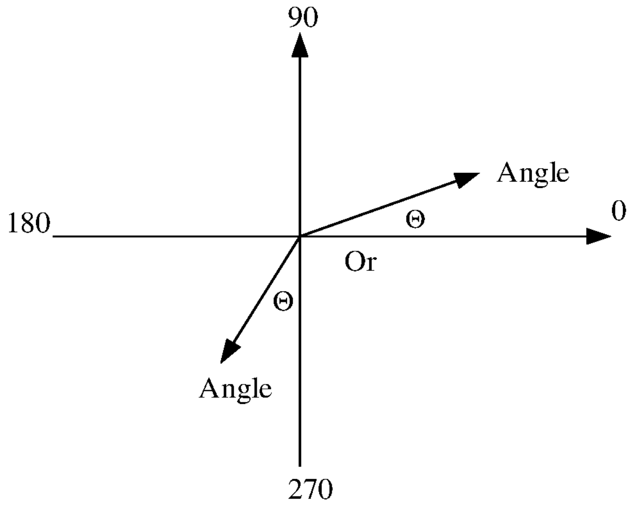
FIG. 13 is a schematic diagram of a signal phase according to an embodiment of this application.

Specifically, in a process in which the receiving end estimates the phase noise, as shown in FIG. 13, if a range of an angle of the signal is between −90 degrees and 90 degrees, and the polarity of the interference signal superimposed on the first real reference signal is positive, a deviation between the angle of the signal and 0 degrees is the phase noise. If a range of an angle of the signal is between 90 degrees and 270 degrees, and the polarity of the interference signal superimposed on the first real reference signal is negative, a deviation between the angle of the signal and 180 degrees is the phase noise.

In Embodiment 2, the first real reference signal is sent at the imaginary signal location, and all the first real reference signals may be used for phase noise estimation. Therefore, phase noise estimation performance and accuracy can be improved without requiring additional signaling overheads.

Embodiment 3: The first signal includes a first imaginary reference signal and a first real reference signal. A sum of a quantity of first imaginary reference signals and a quantity of first real reference signals is an even number, a first imaginary data signal is located at a real signal location, and a first real data signal is located at an imaginary signal location, that is, the first imaginary reference signal is inserted at the real signal location, the first real reference signal is inserted at the imaginary signal location, and the sum of the quantity of inserted first imaginary reference signals and the quantity of inserted first real reference signals is an even number.

A difference between this embodiment and S801 in Embodiment 1 lies in that, the M reference signals include M1 first imaginary reference signals and M2 first real reference signals, for example, M=2N (that is, reference signals whose quantity is an even number are inserted), M1=N, M2=N, and N is a positive integer. In this embodiment, differences between this embodiment and the foregoing embodiments are mainly described. For similarities, refer to the foregoing embodiments.

Figure 14:
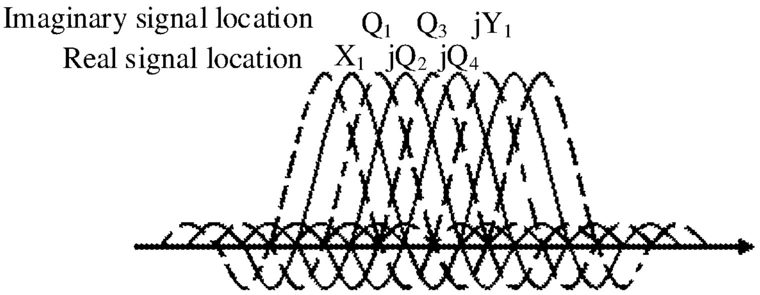
FIG. 14 is a schematic diagram of a signal waveform according to an embodiment of this application.

For example, as shown in FIG. 14, two consecutive first imaginary reference signals are inserted at a real signal location, and two consecutive first real reference signals are inserted at an imaginary signal location, to obtain a first signal [$X_1$, $Q_1$, $jQ_2$, $Q_3$, $jQ_4$, $jY_1$, . . . ], where $X_1$ is real part data (that is, real signal data), and $jY_1$ is imaginary part data (that is, imaginary signal data). Signal interference at the imaginary signal location exists at the real signal location, and signal interference at the real signal location exists at the imaginary signal location.

In the first signal at the transmitting end, Signal Z1 at a location of Q1=[Q1+F1(real part data)+j G1(Q2, Q4)], F1 (real part data) is real interference at the location of $Q_1$, and j G1(Q2, Q4) is imaginary interference at the location of Q1, Signal Z2 at a location of $jQ_2$=[F2(Q1, Q3)+j Q2+j G2 (imaginary part data)], where F2(Q1, Q3) is real interference at a location of $Q_2$, and j G2 (imaginary part data) is imaginary interference at the location of $Q_2$, Signal Z3 at a location of $Q_3$=[Q3+F3 (real part data)+j G3(Q2, Q4)], where F3 (real part data) is real interference at the location of $Q_3$, and j G3(Q2, Q4) is imaginary interference at the location of $Q_3$, and Signal Z4 at a location of $jQ_4$=[F4(Q1, Q3)+j Q4+j G4 (imaginary part data)], where F4(Q1, Q3) is real interference at a location of $Q_4$, and j G4 (imaginary part data) is imaginary interference at the location of $Q_4$.

A difference between this embodiment and S803 in Embodiment 1 lies in that, the third signal obtained by processing the received second signal by the receiving end includes a data signal, and may further include M reference signals, where the M reference signals are used for phase noise estimation, the M reference signals include M1 first imaginary reference signals and M2 first real reference signals, the M1 first imaginary reference signals are located at a real signal location of the third signal, and the M2 first real reference signals are located at an imaginary signal location of the third signal.

The receiving end may estimate the phase noise based on the known amplitude of the reference signal and the estimated polarity of the reference signal.

The foregoing description is still used as an example. In consideration of impact of phase noise and noise, in the second signal received by the receiving end, Signal Z1' at a location of Q1=[Q1+F1 (real part data)+j G1(Q2, Q4)]*exp(1i*Θ)+Noise, Signal Z2' at a location of $jQ_2$=[F2(Q1, Q3)+j Q2+j G2 (imaginary part data)]*exp(1i*Θ)+Noise, Signal Z3' at a location of $Q_3$=[Q3+F3 (real part data)+j G3(Q2, Q4)]*exp(1i*Θ)+Noise, and Signal Z4' at a location of $jQ_4$=[F4(Q1, Q3)+j Q4+j G4 (imaginary part data)]*exp(1i*Θ)+Noise, where O is the phase noise.

In a possible manner 1, a polarity of the reference signal may be related to a signal value of an interference signal superimposed on the reference signal.

In a possible manner 2, polarities of Q2 and $Q_4$ may be set to be the same, and polarities of $Q_1$ and $Q_3$ may be set to be the same. In other words, imaginary part interference signals of Z1 and Z3 are maximized as much as possible, and real part interference signals of Z2 and Z4 are maximized as much as possible. The receiving end may estimate amplitudes of Z1', Z2', Z3', and Z4', and then determine an amplitude of F (real part data). In this case, a polarity of F (real part data) is unknown. However, because the amplitude of F (real part data) is close to interference values brought by Q2 and $Q_4$, the phase noise may be determined based on a range of the amplitude of F (real part data).

Figure 15:
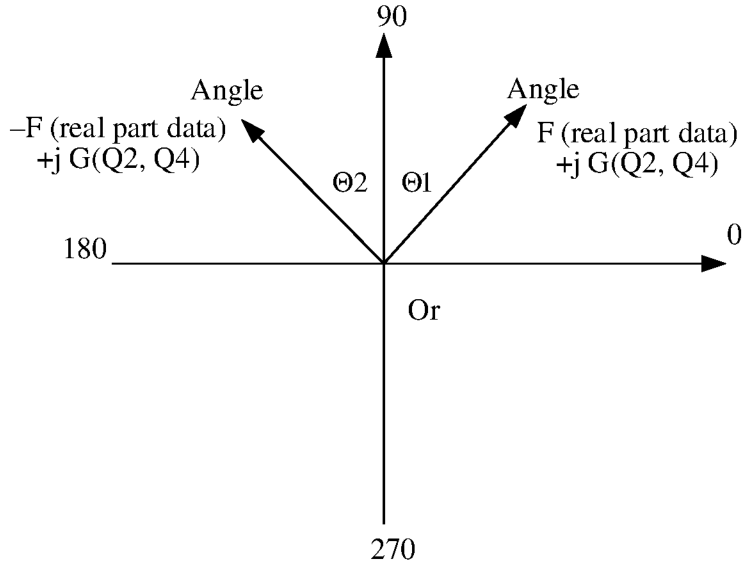
FIG. 15 is a schematic diagram of a signal phase according to an embodiment of this application.

In the manner 2, the transmitting end may determine a plurality of polarity sets of the reference signal, where the polarity set includes M reference signals (optional) and polarities of the M reference signals. The transmitting end may determine a signal value set of each polarity set from the plurality of polarity sets of the reference signal, where the signal value set includes signal values of interference signals to the M reference signals, such as first signal values of interference signals to the M1 first imaginary reference signals, and second signal values of interference signals to the M2 first real reference signals. The transmitting end selects a signal value with a minimum absolute value from each signal value set. If a first signal value with a minimum absolute value is selected, the transmitting end may determine a first maximum value corresponding to the first signal value with the minimum absolute value, determine a first polarity set corresponding to a signal value set to which the first maximum value belongs, and then determine polarities of the M reference signals based on the first polarity set. If a second signal value with a minimum absolute value is selected, the transmitting end may determine a second maximum value corresponding to the second signal value with the minimum absolute value, determine a second polarity set corresponding to a signal value set to which the second maximum value belongs, and then determine polarities of the M reference signals based on the second polarity set. In another possible implementation, the signal value set may include signal values of interference signals superimposed on the M reference signals, signal values of the M reference signals, or the like. This is not limited herein. For example, there are four cases of polarities of Q2 and Q4: [+1, +1], [+1, −1], [−1, +1], and [−1, −1]. Imaginary part interference at Q1 and Q3 corresponding to the four polarities is respectively [−1j, 2j], [−2j, 3j], [−1j, 4j], and [−3j, 1j]. An amplitude value of a smallest interference signal in imaginary part interference signals of Z1 and Z3 is maximized as much as possible. As a polarity selection criterion, polarities of Q2 and Q4 maybe selected as [+1, −1]. As shown in FIG. 15, if a range of an angle of Z1' or Z3' is a range of θ2, F (real part data) is positive. If a range of an angle of Z2' or Z4' is a range of θ1, F (real part data) is negative, where F (real part data)+j G(Q2, Q4) includes F1 (real part data)+j G1(Q2, Q4), and/or F3 (real part data)+j G3(Q2, Q4). In this way, a difference between a phase of a range of an estimated angle and a phase of (F3 (real part data)+j G3(Q2, Q4)) is phase noise, so that phase noise estimation performance can be improved. This is also applicable when the phase noise Θ is very small, so that phase noise estimation accuracy can be improved.

In this embodiment, the first real reference signal is sent at the imaginary signal location, and the first imaginary reference signal is sent at the real signal location. All the reference signals maybe used for phase noise estimation. Therefore, phase noise estimation performance and accuracy can be improved without requiring additional signaling overheads.

Embodiment 4: The first signal includes a first imaginary reference signal and a first real reference signal. A sum of a quantity of first imaginary reference signals and a quantity of first real reference signals is an odd number, a first imaginary data signal is located at a real signal location, and a first real data signal is located at an imaginary signal location, that is, the first imaginary reference signal is inserted at the real signal location, the first real reference signal is inserted at the imaginary signal location, and the sum of the quantity of inserted first imaginary reference signals and the quantity of inserted first real reference signals is an odd number.

A difference between this embodiment and S801 in Embodiment 1 lies in that, the M reference signals include M1 first imaginary reference signals and M2 first real reference signals, for example, M=2N+1 (that is, reference signals whose quantity is an odd number are inserted), M1=N or N+1, and M2=N=1 or N. N or N+1 consecutive first imaginary reference signals may be inserted at the real signal location, and N+1 or N consecutive first real reference signals may be inserted at the imaginary signal location. In this embodiment, differences between this embodiment and the foregoing embodiments are mainly described. For similarities, refer to the foregoing embodiments.

Figure 16:
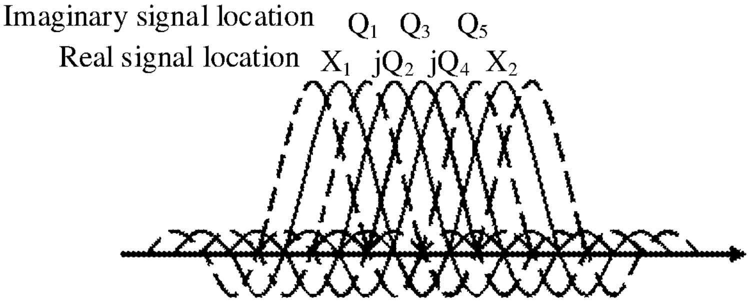
FIG. 16 is a schematic diagram of a signal waveform according to an embodiment of this application.

For example, as shown in FIG. 16, the first signal is [$X_1$, $Q_1$, $jQ_2$, $Q_3$, $jQ_4$, $Q_5$, $X_2$, . . . ], and $X_1$ and $X_2$ are real part data. Signal interference at the imaginary signal location exists at the real signal location, and signal interference at the real signal location exists at the imaginary signal location. Optionally, polarities of the real part data $X_1$ and $X_2$ may be the same or different. If there is imaginary part data, polarities of the imaginary part data may be the same or different.

In a possible manner, a polarity of the reference signal may be related to a signal value of an interference signal superimposed on the reference signal. In another possible manner, polarities of the first imaginary reference signals (Q2 and $Q_4$) at the real signal location maybe set to be the same, and polarities of the first real reference signals (Q1, $Q_3$, and $Q_5$) at the imaginary signal locations may be set to be the same. In still another possible manner, it may be specified that a polarity of the reference signal is related to a polarity of an adjacent data signal. In still another possible manner, a polarity of the reference signal may be related to an identifier of the transmitting end or an identifier of the receiving end.

For processing processes of the transmitting end and the receiving end in this embodiment, refer to the processing processes of the transmitting end and the receiving end in Embodiment 3.

In this embodiment, the first real reference signal is sent at the imaginary signal location, and the first imaginary reference signal is sent at the real signal location. All the reference signals maybe used for phase noise estimation. Therefore, phase noise estimation performance and accuracy can be improved without requiring additional signaling overheads.

Embodiment 5: The first signal includes a first imaginary reference signal and a second imaginary reference signal, and/or a first real reference signal and a second real reference signal, and a sum of a quantity of first imaginary reference signals (if existent), a quantity of second imaginary reference signals (if existent), a quantity of first real reference signals (if existent), and a quantity of second real reference signals (if existent) is an even number, that is, the first imaginary reference signal is inserted at a real signal location, and the second imaginary reference signal is inserted at an imaginary signal location, and/or the first real reference signal is inserted at the imaginary reference signal, and the second imaginary reference signal is inserted at the real signal location. The second imaginary reference signal and the first imaginary reference signal may be arranged at intervals, and the second real reference signal and the first real reference signal may be arranged at intervals. The second imaginary reference signal and/or the second real reference signal may be used as a redundant reference signal to further reduce a PAPR.

Optionally, interference signals of the first imaginary reference signal include a first interference signal and a second interference signal, the first interference signal is an interference signal caused by a data signal (for example, an imaginary data signal) to the first imaginary reference signal, and the second interference signal is an interference signal caused by M3 second imaginary reference signals to the first imaginary reference signal. A sum (or an amplitude of the sum) of a value of the first interference signal and a value of the second interference signal is a preset value (for example, a third preset value), and/or a difference (or an amplitude of the difference) between the value of the first interference signal and the value of the second interference signal is a preset value.

Optionally, interference signals of the first real reference signal include a third interference signal and a fourth interference signal, the third interference signal is an interference signal caused by a data signal (for example, an imaginary data signal) to the first real reference signal, and the fourth interference signal is an interference signal caused by M4 second real reference signals to the first real reference signal. A sum (or an amplitude of the sum) of a value of the third interference signal and a value of the fourth interference signal is a preset value (for example, a fourth preset value), and/or a difference (or an amplitude of the difference) between the value of the third interference signal and the value of the fourth interference signal is a preset value. The third preset value and the fourth preset value are random, and the third preset value and the fourth preset value may be the same or different. This is not limited herein.

A difference between this embodiment and S801 in Embodiment 1 lies in that, the M reference signals include M1 first imaginary reference signals and M3 second imaginary reference signals, and/or M2 first real reference signals and M4 second real reference signals, where M1 (if existent)+M2 (if existent)+M3 (if existent)+M4 (if existent) =2N. M3 is an integer greater than or equal to 0, and M4 is an integer greater than or equal to 0. In this embodiment, differences between this embodiment and the foregoing embodiments are mainly described. For similarities, refer to the foregoing embodiments.

Figure 17:
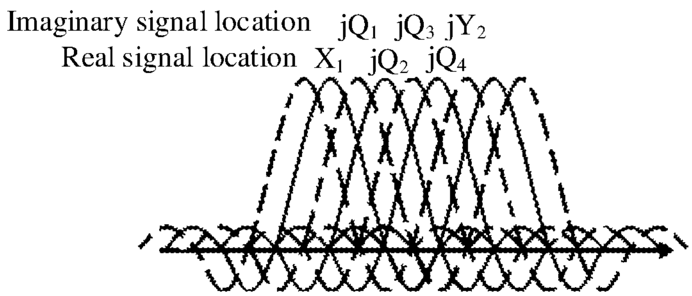
FIG. 17 is a schematic diagram of a signal waveform according to an embodiment of this application.

For example, as shown in FIG. 17, two consecutive first imaginary reference signals are inserted at a real signal location, and two consecutive second imaginary reference signals are inserted at an imaginary signal location, to obtain a first signal [$X_1$, $jQ_1$, $jQ_2$, $jQ_3$,$jQ_4$,$jY_2$, . . . ]. Signal interference at the imaginary signal location exists at the real signal location, and signal interference at the real signal location exists at the imaginary signal location.

In the first signal at the transmitting end, Signal Z2 at a location of $jQ_2$=j ($Q_2$+a1*$Q_1$+a2*$Q_3$+F2 (data interference)), and Signal Z4 at a location of $jQ_4$=j ($Q_4$+a1*$Q_1$+a2*$Q_3$+F4 (data interference)), where $Q_1$ and $Q_3$ are second imaginary reference signals (also referred to as redundant reference signals). The transmitting end may design a redundant reference signal to improve power (or pilot power) of the first imaginary reference signal and the first real reference signal that are received by the receiving end, improve a signal-to-noise ratio, and further improve phase noise estimation performance. The power is also referred to as energy.

In a possible manner, values of $Q_1$ and $Q_3$ may be set, so that energy of a real part signal or an imaginary part signal at a target reference signal is maximized, or amplitude values of all signals or amplitude values of some signals at the target reference signal are fixed (or greater than a preset signal threshold). The target reference signal may be a non-redundant reference signal (for example, $jQ_2$ and $jQ_4$), or a signal obtained by superimposing an interference signal on a non-redundant signal, or maybe a signal obtained by superimposing an interference signal on a reference signal with minimum energy.

In another possible manner, amplitudes of $Q_1$ and $Q_3$ are fixed, and polarities of the redundant reference signal and the non-redundant reference signal may be set. For example, polarities of $Q_1$, $Q_2$, $Q_3$, and $Q_4$ may be set to be the same. Optionally, the polarities of $Q_1$, $Q_2$, $Q_3$, and $Q_4$ are the same as a polarity of a data signal. The data signal herein may be a data signal adjacent (front-adjacent or rear-adjacent) to a reference signal (which maybe a redundant reference signal or a non-redundant reference signal).

In still another possible manner, amplitudes and polarities of $Q_1$, $Q_2$, $Q_3$, and $Q_4$ may be set, so that Z2=A1, Z4=A2, and A1 and A2 may be fixed amplitude values (or greater than a preset amplitude value). To be specific, a redundant reference signal is designed, so that an amplitude value of an interference signal is fixed, or a sum (or a difference) of/between an amplitude of the second real reference signal/second imaginary reference signal and an amplitude of data interference is a fixed value. An amplitude value of a first reference signal (which may be one of $Q_1$ or $Q_3$) or a second reference signal (which may be one of $Q_2$ or $Q_4$), for example, amplitude values of $Q_2$ and $Q_4$, may be notified by a base station side, reported by a network side, or agreed on between a terminal device and a base station device. The amplitude value of the first reference signal or the second reference signal may also be determined based on a value of a corresponding received signal. For example, if the value of the received signal is greater than a specific threshold, the amplitude value of the first reference signal or the second reference signal is B1, or if the value of the received signal is less than the threshold, the amplitude value of the first reference signal or the second reference signal is B2. A polarity of the first reference signal or the second reference signal may be determined based on a polarity of a received signal. For example, the polarity of the first reference signal or the second reference signal is the same as or opposite to a polarity of a corresponding received signal. For example, polarities of $Q_2$ and $Q_4$ are the same as polarities of Z2 and Z4, so that energy of a signal can be increased, and a signal-to-noise ratio of receiving the signal can be improved. For another example, polarities of Q2 and $Q_4$ are opposite to polarities of Z2 and Z4 to reduce a PAPR.

In still another possible manner, amplitudes and polarities of $Q_1$, $Q_2$, $Q_3$, and $Q_4$ may be set, so that Z2=A1, Z4=A2, and A1 and A2 may be fixed values (or greater than a preset value). To be specific, a redundant reference signal is designed, so that a value of an interference signal is fixed, or a sum (or a difference) of/between a value of the second real reference signal/second imaginary reference signal and a value of data interference is a fixed value. The value of the second real reference signal/second imaginary reference signal includes at least one of an amplitude, a polarity, a real part, or an imaginary part of the second real reference signal/second imaginary reference signal. An amplitude value of a first reference signal (which maybe one of $Q_1$ or $Q_3$) or a second reference signal (which maybe one of Q2 or $Q_4$), for example, amplitude values of Q2 and $Q_4$, may be notified by a base station side, reported by a network side, or agreed on between a terminal device and a base station device. The amplitude value of the first reference signal or the second reference signal may also be determined based on a value of a corresponding received signal. For example, if the value of the received signal is greater than a specific threshold, the amplitude value of the first reference signal or the second reference signal is B1, or if the value of the received signal is less than the threshold, the amplitude value of the first reference signal or the second reference signal is B2. A polarity of the first reference signal or the second reference signal may be determined based on a polarity of a received signal. For example, the polarity of the first reference signal or the second reference signal is the same as or opposite to a polarity of a corresponding received signal. For example, polarities of Q2 and $Q_4$ are the same as polarities of Z2 and Z4, so that energy of a signal can be increased, and a signal-to-noise ratio of receiving the signal can be improved. For another example, polarities of Q2 and $Q_4$ are opposite to polarities of Z2 and Z4 to reduce a PAPR.

Polarities of Z2' and Z4' received by the receiving end may be fixed or unfixed, and may be positive or negative. The receiving end may know the polarities of Z2' and Z4', or the receiving end may estimate the polarities of Z2' and Z4'. Polarities of Z2 and Z2' maybe the same or different, and polarities of Z4 and Z4' may be the same or different. Polarities of Q2 and $Q_4$ maybe the same as or opposite to polarities of (a1*$Q_1$+a2*$Q_3$+F2 (data interference)) and (a1*$Q_1$+a2*$Q_3$+F4 (data interference)). Polarities of Q2 and $Q_4$ may be the same as or opposite to polarities of Z2 and Z4. A difference between this embodiment and S803 in Embodiment 1 lies in that a possible processing process of the transmitting end is as follows: A polarity of a sum of signal values of an interference signal caused by a redundant reference signal and an interference signal caused by a data signal may be positive or negative. For example, a value of a1*$Q_1$+a2*$Q_3$+F2 (data interference) maybe −IA1 or +IA1, and a value of a1*$Q_1$+a2*$Q_3$+F4 (data interference) may be −IA2 or +IA2. For [−IA1, −IA2], it can be learned that $Q_1$ and $Q_3$ are [1, 3]; for [IA1, −IA2], it can be learned that $Q_1$ and $Q_3$ are [1, 2.5]; for [−IA1, IA2], it can be learned that $Q_1$ and $Q_3$ are [−1, 3]; and for [IA1, IA2], it can be learned that $Q_1$ and $Q_3$ are [4, 1]. A target is to minimize a largest value in amplitudes of $Q_1$ and $Q_3$, so as to determine that the largest value in the amplitudes of $Q_1$ and $Q_3$ is 4, and a minimum value of the largest value is 1. In this way, a smallest group of amplitudes, that is, [1, 2.5], maybe selected from [i, 3] and [1, 2.5].

Figure 18:
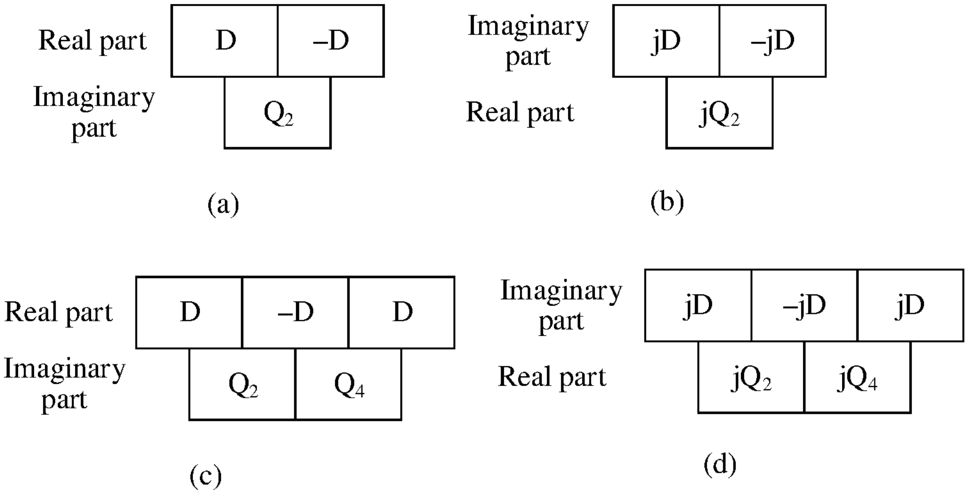
FIG. 18 is a schematic diagram of a signal according to an embodiment of this application.

In another possible manner, a polarity of the reference signal is opposite to polarities of some data signals (or some reference signals) that cause interference to the reference signal. As shown in (a) in FIG. 18, two real data signals adjacent to Q2 cause interference to $Q_2$. It may be specified that the two real data signals have a same amplitude and opposite polarities. Because filter coefficients at D and −D are a same amplitude, interference at Q2 may be mutually canceled to reduce interference at $Q_2$. One of the two real data signals may be a redundant signal. As shown in (b) in FIG. 18, two imaginary data signals adjacent to Q2 cause interference to $Q_2$. It may be specified that the two imaginary data signals have a same amplitude and opposite polarities. Because filter coefficients at jD and −jD are a same amplitude, interference at Q2 may be mutually canceled to reduce interference at $Q_2$. One of the two imaginary data signals may be a redundant signal. Similarly, for a plurality of reference signals, when there are more than two real data signals that cause interference to $Q_2$, as shown in (c) in FIG. 18, two real data signals adjacent to $Q_2$ cause interference to $Q_2$, and two real data signals adjacent to $Q_4$ cause interference to $Q_4$. It maybe specified that the two adjacent real data signals have a same amplitude and opposite polarities. In this way, interference of D and −D at $Q_2$ and $Q_4$ may be mutually canceled. One or two of the three real data signals may be redundant signals. As shown in (d) in FIG. 18, two imaginary data signals adjacent to $Q_2$ cause interference to $Q_2$, and two imaginary data signals adjacent to $Q_4$ cause interference to $Q_4$. It maybe specified that the two adjacent imaginary data signals have a same amplitude and opposite polarities. In this way, interference of jD and −jD at $Q_2$ and $Q_4$ may be mutually canceled. One or two of the three imaginary data signals maybe redundant signals. Herein, amplitudes and polarities of $Q_2$ and $Q_4$ maybe configured by a network device, or maybe reported by a terminal device, or maybe specified in a protocol. Polarities of $Q_2$ and $Q_4$ may be the same as a polarity of the received signal.

In this case, energy of the reference signal may be implemented by designing a pilot arrangement solution. Different pilot quantities may correspond to different pilot arrangement solutions.

Figure 19:
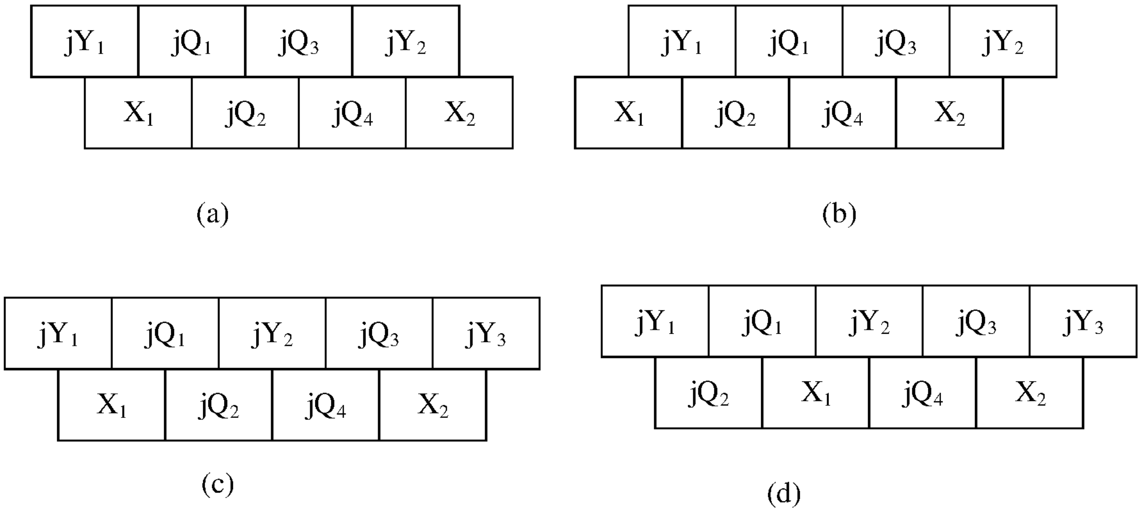
FIG. 19 is a schematic diagram of a signal according to an embodiment of this application.

FIG. 19 shows a possible imaginary-number pilot arrangement solution provided when a quantity of pilots is 2. A first signal in (a) in FIG. 19 is [$jY_1$, $X_1$, $jQ_1$, $jQ_2$, $jQ_3$, $jQ_4$, $jY_2$, $X_2$, . . . ], a first signal in (b) in FIG. 19 is [$X_1$, $jY_1$, $jQ_2$, $jQ_1$, $jQ_4$, $jQ_3$, $X_2$, $jY_2$, . . . ], a first signal in (c) in FIG. 19 is [$jY_1$, $X_1$, $jQ_1$, $jQ_2$, $jY_2$, $jQ_4$, $jQ_3$, $X_2$, $jY_3$, . . . ], and a first signal in (d) in FIG. 19 is [$jY_1$, $jQ_2$, $jQ_1$, $X_1$, $jY_2$, $jQ_4$, $jQ_3$, $X_2$, $jY_3$, . . . ].

Figure 20:
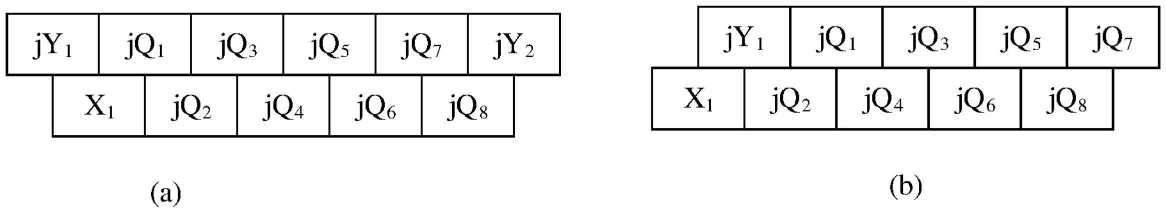
FIG. 20 is a schematic diagram of a signal according to an embodiment of this application.

FIG. 20 shows a possible imaginary-number pilot arrangement solution provided when a quantity of pilots is 4. A first signal in (a) in FIG. 20 is [$jY_1$, $X_1$, $jQ_1$, $jQ_2$, $jQ_3$, $jQ_4$, $jQ_5$, $jQ_6$, $jQ_7$, $jQ_8$, $jY_2$, . . . ], and a first signal in (b) in FIG. 20 is [$X_1$, $jY_1$, $jQ_2$, $jQ_1$, $jQ_4$, $jQ_3$, $jQ_6$, $jQ_5$,$jQ_8$, $jQ_7$, . . . ]

It may be understood that the imaginary-number pilot arrangement solution provided in FIG. 19 or FIG. 20 is also applicable to a real-number pilot arrangement solution, and optionally, the real-number pilot arrangement solution is opposite to the imaginary-number pilot arrangement solution.

In this embodiment, a real reference signal is sent at an imaginary signal location, and an imaginary reference signal is sent at a real signal location. All the reference signals may be used for phase noise estimation. Therefore, phase noise estimation performance and accuracy can be improved without requiring additional signaling overheads, and energy of the reference signal can be improved. In addition, an imaginary-number pilot is inserted at the real signal location, to ensure that minimum signal energy of an imaginary part pilot at a real-part pilot location is maximized, and a real-number pilot is inserted at the imaginary signal location, to ensure minimum energy of a real-part pilot at an imaginary-part pilot location is maximized. Therefore, energy of the reference signal can be improved, and phase noise estimation performance and accuracy can be improved.

Embodiment 6: The first signal includes a first imaginary reference signal and a second imaginary reference signal, and/or a first real reference signal and a second real reference signal, and a sum of a quantity of first imaginary reference signals (if existent), a quantity of second imaginary reference signals (if existent), a quantity of first real reference signals (if existent), and a quantity of second real reference signals (if existent) is an odd number, that is, the first imaginary reference signal is inserted at a real signal location, and the second imaginary reference signal is inserted at an imaginary signal location, and/or the first real reference signal is inserted at the imaginary reference signal, and the second imaginary reference signal is inserted at the real signal location.

A difference between this embodiment and S801 in Embodiment 1 lies in that, the M reference signals include M1 first imaginary reference signals and M3 second imaginary reference signals, and/or M2 first real reference signals and M4 second real reference signals, where M1 (if existent)+M2 (if existent)+M3 (if existent)+M4 (if existent) =2N+1. N or N+1 consecutive first real reference signals and second real reference signals (if existent) maybe inserted at the real signal location, and N+1 or N consecutive first real reference signals and second imaginary reference signals (if existent) maybe inserted at the imaginary signal location. In this embodiment, differences between this embodiment and the foregoing embodiments are mainly described. For similarities, refer to the foregoing embodiments.

Figure 21:
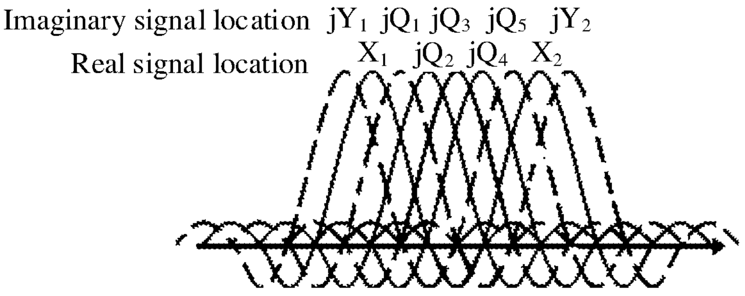
FIG. 21 is a schematic diagram of a signal waveform according to an embodiment of this application.

For example, as shown in FIG. 21, two consecutive first imaginary reference signals are inserted at a real signal location, and three consecutive second imaginary reference signals are inserted at an imaginary signal location, to obtain a first signal [$jY_1$, $X_1$, $jQ_1$, $jQ_2$, $jQ_3$, $jQ_4$, $jQ_5$, $X_2$, $jY_2$, . . . ], where $X_1$ and $X_2$ are real part data, and $jY_1$ and $jY_2$ are imaginary part data. Signal interference at the imaginary signal location exists at the real signal location, and signal interference at the real signal location exists at the imaginary signal location.

For processing processes of the transmitting end and the receiving end in this embodiment, refer to the processing processes of the transmitting end and the receiving end in Embodiment 5.

In this case, energy of the reference signal may be implemented by designing a pilot arrangement solution. Different pilot quantities may correspond to different pilot arrangement solutions.

Figure 22:
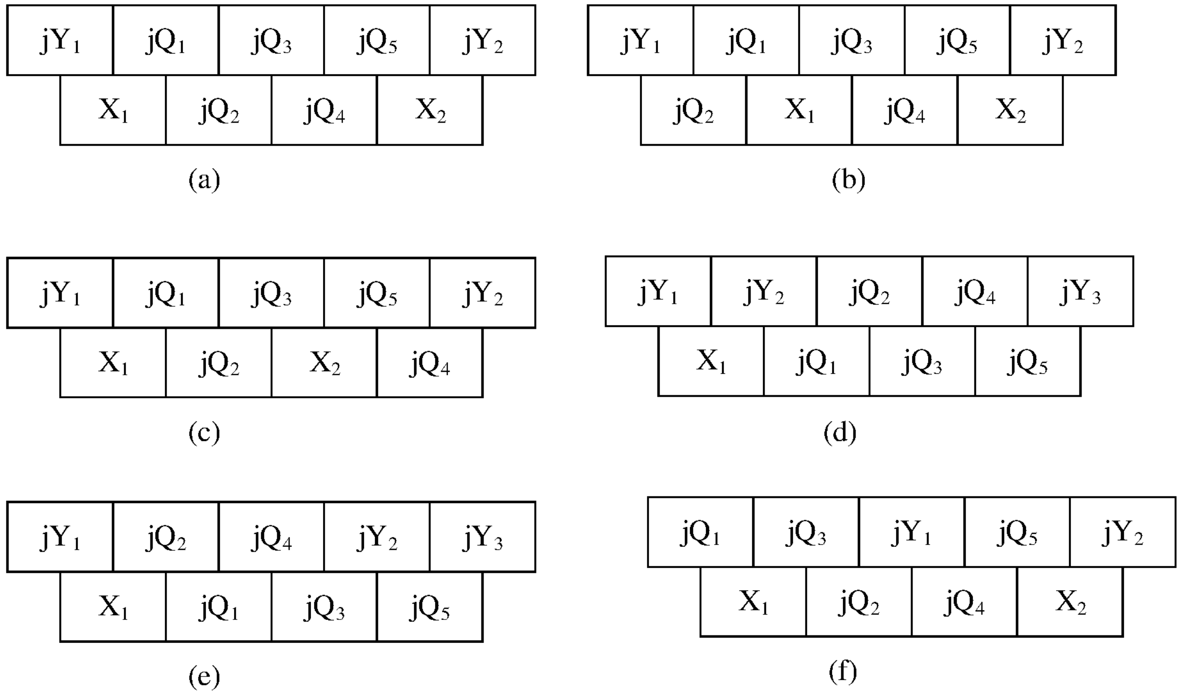
FIG. 22 is a schematic diagram of a signal according to an embodiment of this application.

FIG. 22 shows a possible imaginary-number pilot arrangement solution provided when a quantity of pilots is 2. A first signal in (a) in FIG. 22 is [$jY_1$, $X_1$, $jQ_1$, $jQ_2$, $jQ_3$, $jQ_4$, $jQ_5$, $X_2$, $jY_2$, . . . ], a first signal in (b) in FIG. 22 is [$jY_1$, $jQ_2$, $jQ_1$, $X_1$, $jQ_3$, $jQ_4$,$jQ_5$, $X_2$, $jY_2$, . . . ], a first signal in (c) in FIG. 22 is [$jY_1$, $X_1$, $jQ_1$, $jQ_2$, $jQ_3$, $X_2$,$jQ_5$,$jQ_4$,$jY_2$, . . . ], a first signal in (d) in FIG. 22 is [$jY_1$, $X_1$, $jY_2$,$jQ_1$,$jQ_2$,$jQ_3$, $jQ_4$,$jQ_5$,$jY_3$, . . . ], a first signal in (e) in FIG. 22 is [$jY_1$, $X_1$, $jQ_2$, $jQ_1$, $jQ_4$,$jQ_3$,$jY_2$, $jQ_5$, $jY_3$, . . . ], a first signal in (f) in FIG. 22 is [$jQ_1$, $X_1$, $jQ_3$, $jQ_2$, $jY_1$, $jQ_4$, $jQ_5$, $X_2$, $jY_2$, . . . ].

Figure 23:
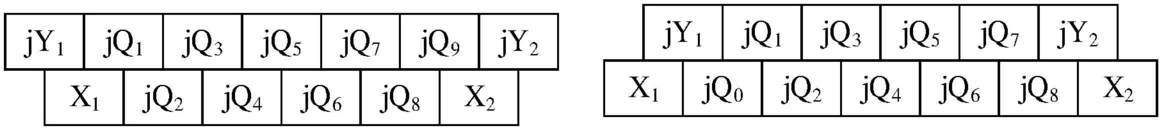
FIG. 23 is a schematic diagram of a signal according to an embodiment of this application.

FIG. 23 shows a possible imaginary-number pilot arrangement solution provided when a quantity of pilots is 4. A first signal in (a) in FIG. 23 is [$jY_1$, $X_1$, $jQ_1$, $jQ_2$, $jQ_3$, $jQ_4$, $jQ_5$,$jQ_6$, $jQ_7$, $jQ_8$, $jQ_9$, $X_2$, $jY_2$, . . . ], and a first signal in (b) in FIG. 23 is [$X_1$, $jY_1$, $jQ_0$, $jQ_1$, $jQ_2$, $jQ_3$,$jQ_4$,$jQ_5$, $jQ_6$, $JQ_7$, $JQ_8$, $jY_2$, $X_2$, . . . ].

It may be understood that the imaginary-number pilot arrangement solution provided in FIG. 22 or FIG. 23 is also applicable to a real-number pilot arrangement solution, and optionally, the real-number pilot arrangement solution is opposite to the imaginary-number pilot arrangement solution.

In this embodiment, a real reference signal is sent at an imaginary signal location, and an imaginary reference signal is sent at a real signal location. All the reference signals may be used for phase noise estimation. Therefore, phase noise estimation performance and accuracy can be improved without requiring additional signaling overheads, and energy of the reference signal can be improved. In addition, an imaginary-number pilot is inserted at the real signal location, to ensure that minimum signal energy of an imaginary part pilot at a real-part pilot location is maximized, and a real-number pilot is inserted at the imaginary signal location, to ensure minimum energy of a real-part pilot at an imaginary-part pilot location is maximized. Therefore, energy of the reference signal can be improved, and phase noise estimation performance and accuracy can be improved.

Embodiment 7: is applicable to a multi-user scenario. In this scenario, parameter signals whose quantity is an even number may be inserted (for example, Embodiment 3 and Embodiment 5), or parameter signals whose quantity is an odd number (for example, Embodiment 4 and Embodiment 6) may be inserted. It may be understood that Embodiment 7 may be used in combination with the foregoing embodiments, or may be used independently.

In this embodiment, an example in which reference signals whose quantity is an even number are inserted is used for description. A processing process of inserting reference signals whose quantity is an odd number is similar to that of inserting the reference signals whose quantity is the even number. Details are not described in this embodiment.

A difference between this embodiment and S801 in Embodiment 1 lies in that, the transmitting end performs same processing for different users, so that reference signals of the different users may be set at a same imaginary signal location or real signal location. For example, as shown in FIG. 17, a first real reference signal is inserted at an imaginary signal location, and a second real reference signal is inserted at a real signal location, to obtain a first signal, where the second real reference signal is used to ensure that an amplitude of the first real reference signal is fixed and does not interfere with the first real reference signal, and can improve energy of the first real reference signal, to further improve phase noise estimation performance and accuracy.

A difference between this embodiment and S803 in Embodiment 1 lies in that, in consideration of impact of phase noise and noise, in a second signal received by a user 1, Signal Z12 at a location of Q2=j ($Q_{12}$+a1*$Q_{11}$+a1*$Q_{13}$+Others)*exp(1i*Θ1)+Noise, and Signal Z14 at a location of $Q_4$=j ($Q_{14}$+a1*$Q_{13}$+a1*$Q_{12}$+Others)*exp(1i*Θ1)+Noise; and in a second signal received by a user 2, signal Z22 at a location of Q2=j ($Q_{22}$+a1*$Q_{21}$+a1*$Q_{23}$+Others)*exp(1i*Θ2)+Noise, and Signal Z24 at a location of $Q_4$=j ($Q_{24}$+a1*$Q_{23}$+a1*$Q_{22}$+Others)*exp(1i*Θ2)+Noise.

If $Q_{12}$+a1*$Q_{11}$+a1*$Q_{13}$+Others=A1, and $Q_{14}$+a1*$Q_{13}$+a1*$Q_{12}$+Others=A1, $Q_{22}$+a1*$Q_{21}$+a1*$Q_{23}$+Others=A2, $Q_{24}$+a1*$Q_{23}$+a1*$Q_{22}$+Others=−A2. Values of A1 and A2 maybe configured by a network device, reported by a terminal device, specified in a protocol, or the like. The values (including an amplitude value and a polarity value) of A1 and A2 may be the same (for example, A1=A2=A). Polarities of A1 and A2 may be known or unknown. The polarity values of A1 and A2 may be opposite, and may be configured by a network device, reported by a terminal device, or specified in a protocol, or may be deduced based on a polarity of a received signal. The values of A1 and A2 may be greater than a preset threshold. The threshold may be configured by the network device, reported by the terminal device, or specified in a protocol. The threshold may be related to a modulation mode or a modulation and coding scheme.

Values of $Q_{12}$ and $Q_{14}$ may be the same (for example, $Q_{12}$=$Q_{14}$=B1) or different, and polarities of $Q_{12}$ and $Q1_4$ may be the same as or different from the polarity of A1. Values of $Q_{22}$ and $Q_{24}$ maybe the same (for example, $Q_{22}$=$Q_{24}$=B2) or different, and polarities of $Q_{22}$ and $Q_{24}$ may be the same as or different from the polarity of A2. Polarities of B1 and B2 may be positive or negative. Values of B1 and A1 may be related to a device identifier, a port number, or a cell identifier of the user 1. The network device or the terminal device may generate a sequence based on the device identifier, the port number, or the cell identifier of the user 1, and determine B1 or A1 based on a value of the sequence. Values of B2 and A2 may be related to a device identifier, a port number, or a cell identifier of the user 2. The network device or the terminal device may generate a sequence based on the device identifier, the port number, or the cell identifier of the user 2, and determine B2 or A2 based on a value of the sequence. Optionally, the sequence corresponding to the user 1 is orthogonal to a sequence corresponding to a user.

Figure 24:
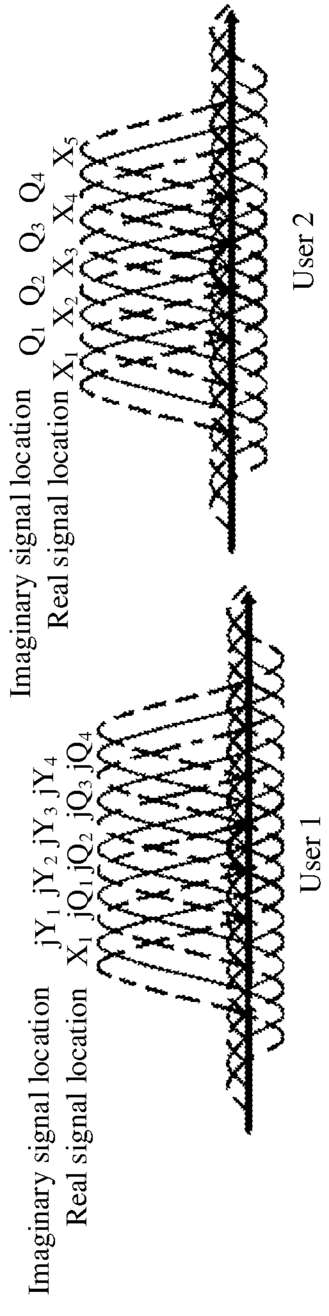
FIG. 24 is a schematic diagram of a signal waveform according to an embodiment of this application.

A difference between this embodiment and S801 in Embodiment 1 lies in that, the transmitting end performs different processing for different users, so that reference signals of the different users may be set at different imaginary signal locations or real signal locations. For example, as shown in FIG. 24, the reference signal of the user 1 includes first imaginary reference signals (such as $jQ_1$, $jQ_2$, $jQ_3$, and $jQ_4$), which are placed at a real signal location. As shown in FIG. 24, the reference signal of the user 2 includes first real reference signals (such as $Q_1$, $Q_2$, $Q_3$, and Q4), which are placed at an imaginary signal location. For polarities of the first imaginary reference signal and the first real reference signal, refer to the foregoing embodiments. Details are not described herein again.

Figure 25:
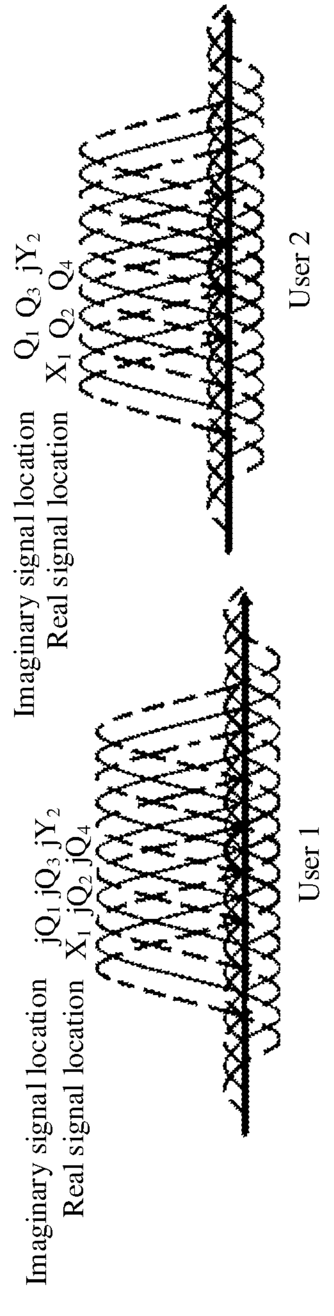
FIG. 25 is a schematic diagram of a signal waveform according to an embodiment of this application.

A difference between this embodiment and S801 in Embodiment 1 lies in that, the transmitting end performs different processing for different users, so that reference signals of the different users may be set as imaginary reference signals or real reference signals, where the imaginary reference signals may be set at the imaginary signal location and the real signal location, and the real reference signals may be set at the imaginary signal location and the real signal location. For example, as shown in FIG. 25, the reference signal of the user 1 includes first imaginary reference signals (such as $jQ_2$ and $jQ_4$) and second imaginary reference signals (such as $jQ_1$ and $jQ_3$). The first imaginary reference signals are set at the real signal location, and the second imaginary reference signals are set at the imaginary signal location. As shown in FIG. 25, the reference signal of the user 2 includes first real reference signals (such as Q2 and $Q_4$) and second real reference signals (such as $Q_1$ and $Q_3$), the first real reference signals are set at the imaginary signal location, and the second real reference signals are set at the real signal location. Signal locations at which the reference signals of the user 1 and the user 2 are placed may be the same or different. The signal locations at which the reference signals of the user 1 and the user 2 are placed may be determined based on a device identifier of the user, or may be allocated by the network device.

A quantity of reference signals of the user 1 may be an odd number or an even number, and a quantity of reference signals of the user 2 may be an odd number or an even number.

For example, when the quantities of reference signals of the user 1 and the user 2 are both even numbers, the user 1 has 2N reference signals, where N first imaginary reference signals are placed at a real signal location, and N second imaginary reference signals are placed at an imaginary signal location; and the user 2 has 2N reference signals, where N first real reference signals are placed at an imaginary signal location, and N second real reference signals are placed at a real signal location. FIG. 25 is still used as an example. $Q_1$ and $Q_3$ of the user 1 are redundant reference signals, and $Q_2$ and $Q_4$ of the user 2 in FIG. 25 are redundant reference signals.

For another example, when the quantities of reference signals of the user 1 and the user 2 are both odd numbers, the user 1 has 2N+1 reference signals, where N first imaginary reference signals are placed at a real signal location, and N+1 second imaginary reference signals are placed at an imaginary signal location; and the user 2 has 2N+1 reference signals, where N first real reference signals are placed at an imaginary signal location, and N+1 second real reference signals are placed at a real signal location. Locations of some reference signals of the user 1 and the user 2 are the same, for example, locations of 2N reference signals are the same.

For another example, when the quantity of reference signals of the user 1 is an odd number, and the quantity of reference signals of the user 2 is an even number, the user 1 has 2N+1 reference signals, where N first imaginary reference signals are placed at a real signal location, and N+1 second imaginary reference signals are placed at an imaginary signal location; and the user 2 has 2N reference signals, where N first real reference signals are placed at an imaginary signal location, and N second real reference signals are placed at a real signal location. Locations of some reference signals of the user 1 and the user 2 are the same, for example, locations of 2N reference signals are the same.

For another example, when the quantity of parameter signals of the user 1 is an even number, and the quantity of reference signals of the user 2 is an odd number, the user 1 has 2N reference signals, where N first imaginary reference signals are placed at a real signal location, and N second imaginary reference signals are placed at an imaginary signal location; and the user 2 has 2N+1 reference signals, where N first real reference signals are placed at an imaginary signal location, and N+1 second real reference signals are placed at a real signal location. Locations of some reference signals of the user 1 and the user 2 are the same, for example, locations of 2N reference signals are the same.

In this embodiment, multi-port multi-user transmission is supported, so that signal sending efficiency can be improved, and phase noise estimation performance and accuracy can be improved.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that, in the foregoing embodiments, the method and/or the step implemented by the transmitting end may also be implemented by a component (for example, a chip or a circuit) that may be used by the transmitting end, and the method and/or the step implemented by the receiving end may also be implemented by a component that may be used by the receiving end.

In the foregoing embodiments provided in this application, the methods provided in embodiments of this application are separately described from a perspective of interaction between the transmitting end and the receiving end. To implement the functions in the method provided in the foregoing embodiments of this application, the transmitting end and the receiving end each may include a hardware structure and/or a software module, to implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

The following describes, with reference to the accompanying drawings, a communication apparatus for implementing the foregoing method in embodiments of this application. Therefore, all the foregoing content may be used in the following embodiments. Repeated content is not described again.

Figure 26:
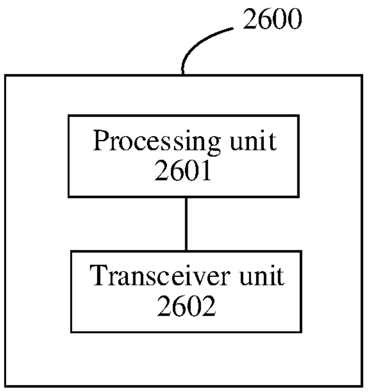
FIG. 26 is a schematic diagram of a structure of a communication apparatus according to an embodiment of this application.

FIG. 26 shows a possible representation form of a communication apparatus according to an embodiment of this application. The communication apparatus 2600 maybe configured to implement functions or steps implemented by a transmitting end or a receiving end in the foregoing method embodiments. The communication apparatus may include a processing unit 2601 and a transceiver unit 2602. Optionally, the communication apparatus may further include a storage unit. The storage unit may be configured to store instructions (code or a program) and/or data. The processing module 2601 and the transceiver module 2602 maybe coupled to the storage unit. For example, the processing unit 2601 may read instructions (code or a program) and/or data in the storage unit, to implement a corresponding method. The foregoing units may be independently disposed, or may be partially or completely integrated.

In some possible implementations, the communication apparatus 2600 can correspondingly implement behaviors and functions of the transmitting end in the foregoing method embodiments. For example, the processing unit 2601 is configured to obtain a first signal.

The transceiver unit 2602 is configured to send the first signal.

The first signal includes a data signal and M reference signals, and the M reference signals include at least one of the following: M1 first imaginary reference signals and M2 first real reference signals, where M=M1+M2, M is an integer greater than 0, M1 is an integer greater than or equal to 0, and M2 is an integer greater than or equal to 0.

The M1 first imaginary reference signals are located at a real signal location of the first signal.

The M2 first real reference signals are located at an imaginary signal location of the first signal.

If the communication apparatus 2600 generates the first signal, when obtaining the first signal, the processing unit 2601 is specifically configured to generate the first signal.

If another communication apparatus generates the first signal, the communication apparatus 2600 obtains the first signal from the another communication apparatus. When obtaining the first signal, the processing unit 2601 is specifically configured to receive the first signal by using the transceiver unit 2602, that is, the transceiver unit 2602 is further configured to receive the first signal generated and sent by the another communication apparatus. Usually, the another communication apparatus is different from a receiving end.

In some possible implementations, amplitudes of the M1 first imaginary reference signals are a first preset value; and amplitudes of the M2 first real reference signals are a second preset value.

In some possible implementations, a polarity of the reference signal is the same as a polarity of an interference signal to the reference signal.

In some possible implementations, a polarity of the first imaginary reference signal is the same as a polarity of an adjacent first imaginary reference signal; and a polarity of the first real reference signal is the same as a polarity of an adjacent first real reference signal.

In some possible implementations, a polarity of the reference signal is determined based on an identifier of a device that receives the first signal, or is determined based on an identifier of the communication apparatus 2600.

In some possible implementations, the data signal includes a real data signal and an imaginary data signal, the real data signal is located at a real signal location, and the imaginary data signal is located at an imaginary signal location; two imaginary data signals adjacent to the M1 first imaginary reference signals have a same amplitude and opposite polarities; and two real data signals adjacent to the M2 first real reference signals have a same amplitude and opposite polarities.

In some possible implementations, the first signal further includes at least one of the following: M3 second imaginary reference signals and M4 second real reference signals, where M3 is an integer greater than or equal to 0, and M4 is an integer greater than or equal to 0.

In some possible implementations, the second imaginary reference signal and the first imaginary reference signal are arranged at intervals; and the second real reference signal and the first real reference signal are arranged at intervals.

In some possible implementations, interference signals of the first imaginary reference signal include a first interference signal and a second interference signal, a sum of a value of the first interference signal and a value of the second interference signal or an amplitude of the sum is a third preset value, the first interference signal is an interference signal caused by the data signal to the first imaginary reference signal, and the second interference signal is an interference signal caused by the M3 second imaginary reference signals to the first imaginary reference signal; and interference signals of the first real reference signal include a third interference signal and a fourth interference signal, a sum of a value of the third interference signal and a value of the fourth interference signal or an amplitude of the sum is a fourth preset value, the third interference signal is an interference signal caused by the data signal to the first real reference signal, and the fourth interference signal is an interference signal caused by the M4 second real reference signals to the first real reference signal.

In some possible implementations, the communication apparatus 2600 can correspondingly implement behaviors and functions of the receiving end in the foregoing method embodiments. For example, the transceiver unit 2602 is configured to obtain a second signal.

The processing unit 2601 is configured to process the second signal to obtain a third signal.

The third signal includes a data signal and M reference signals, and the M reference signals include at least one of the following: M1 first imaginary reference signals and M2 first real reference signals, where M=M1+M2, M is an integer greater than 0, M1 is an integer greater than or equal to 0, and M2 is an integer greater than or equal to 0.

The M1 first imaginary reference signals are located at a real signal location of the third signal.

The M2 first real reference signals are located at an imaginary signal location of the third signal.

In some possible implementations, amplitudes of the M1 first imaginary reference signals are a first preset value; and amplitudes of the M2 first real reference signals are a second preset value.

In some possible implementations, a polarity of the reference signal is the same as a polarity of an interference signal to the reference signal.

In some possible implementations, a polarity of the first imaginary reference signal is the same as a polarity of an adjacent first imaginary reference signal; and a polarity of the first real reference signal is the same as a polarity of an adjacent first real reference signal.

In some possible implementations, a polarity of the reference signal is determined based on an identifier of the communication apparatus 2600, or is determined based on an identifier of a device that sends the third signal.

In some possible implementations, the data signal includes a real data signal and an imaginary data signal, the real data signal is located at a real signal location, and the imaginary data signal is located at an imaginary signal location; two imaginary data signals adjacent to the M1 first imaginary reference signals have a same amplitude and opposite polarities; and two real data signals adjacent to the M2 first real reference signals have a same amplitude and opposite polarities.

In some possible implementations, the third signal further includes at least one of the following: M3 second imaginary reference signals and M4 second real reference signals, where M3 is an integer greater than or equal to 0, and M4 is an integer greater than or equal to 0.

In some possible implementations, the second imaginary reference signal and the first imaginary reference signal are arranged at intervals; and the second real reference signal and the first real reference signal are arranged at intervals.

In some possible implementations, interference signals of the first imaginary reference signal include a first interference signal and a second interference signal, a sum of a value of the first interference signal and a value of the second interference signal or an amplitude of the sum is a third preset value, the first interference signal is an interference signal caused by the data signal to the first imaginary reference signal, and the second interference signal is an interference signal caused by the M3 second imaginary reference signals to the first imaginary reference signal; and interference signals of the first real reference signal include a third interference signal and a fourth interference signal, a sum of a value of the third interference signal and a value of the fourth interference signal or an amplitude of the sum is a fourth preset value, the third interference signal is an interference signal caused by the data signal to the first real reference signal, and the fourth interference signal is an interference signal caused by the M4 second real reference signals to the first real reference signal.

It should be noted that, division into the modules in embodiments of this application is an example and is merely logical function division, and may be other division in an actual implementation. In addition, function units in embodiments of this application maybe integrated into one processing unit, and each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the integrated unit may be stored in a storage medium as a computer software product, and includes several instructions for instructing a computer device (which may be a personal computer, a server, a network device, or the like) or a processor (processor) to perform all or some of the steps of the methods in embodiments of this application.

It should be understood that the processing module in embodiments of this application may be implemented by a processor/processing circuit or a circuit component related to a processor/processing circuit, and the transceiver module may be implemented by a transceiver/a transceiver interface, a circuit component related to a transceiver/a transceiver interface, or a communication interface.

Figure 27:
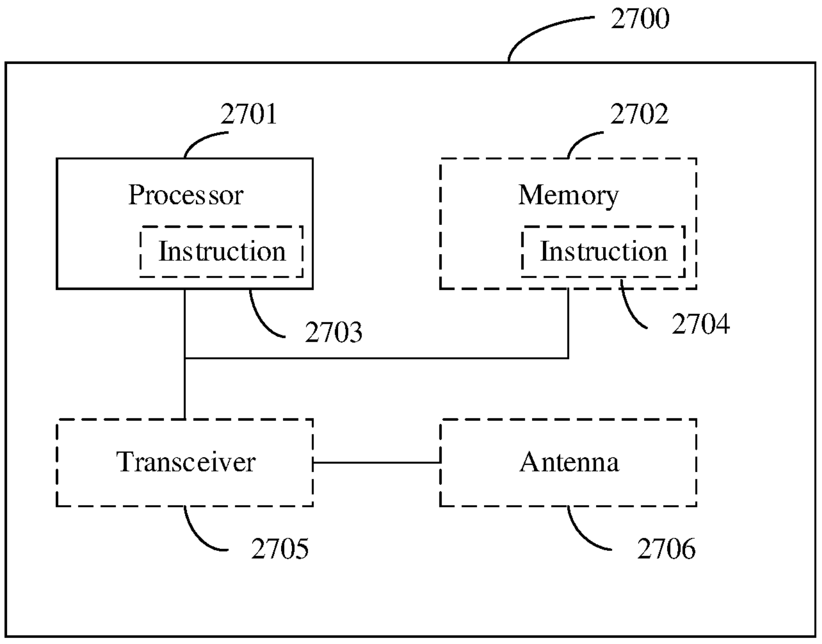
FIG. 27 is a schematic diagram of a structure of a communication apparatus according to an embodiment of this application.

As shown in FIG. 27, an embodiment of this application further provides a schematic diagram of a structure of a communication apparatus 2700. The apparatus 2700 may be configured to implement the method described in the foregoing method embodiments. For details, refer to the descriptions in the foregoing method embodiments.

The apparatus 2700 includes one or more processors 2701. The processor 2701 may be a general-purpose processor, a dedicated processor, or the like. For example, the processor may be a baseband processor or a central processing unit. The baseband processor may be configured to process a communication protocol and communication data. The central processing unit may be configured to: control a communication apparatus (for example, a base station, a terminal, or a chip), execute a software program, and process data of the software program. The communication apparatus may include a transceiver unit, configured to input (receive) and output (send) signals. For example, the transceiver unit may be a transceiver or a radio frequency chip.

The apparatus 2700 includes one or more processors 2701, and the one or more processors 2701 may implement the method in the foregoing embodiments.

Optionally, the processor 2701 may further implement another function in addition to the method in the foregoing embodiments.

Optionally, in a design, the processor 2701 may execute instructions, so that the apparatus 2700 performs the method described in the foregoing method embodiments. All or some of the instructions may be stored in the processor, for example, an instruction 2703, or all or some of the instructions may be stored in a memory 2702 coupled to the processor, for example, an instruction 2704. Alternatively, the instructions 2703 and 2704 may be jointly used to enable the apparatus 2700 to perform the method described in the foregoing method embodiments. The instruction 2703 is also referred to as a computer program.

In another possible design, the communication apparatus 2700 may also include a circuit, and the circuit may implement functions in the foregoing method embodiments.

In another possible design, the apparatus 2700 may include one or more memories 2702, and the memories 2702 store an instruction 2704. The instruction may be run on the processor, so that the apparatus 2700 performs the method described in the foregoing method embodiments. Optionally, the memory may further store data. Optionally, the processor may also store instructions and/or data. For example, the one or more memories 2702 may store the correspondence described in the foregoing embodiments, or the related parameter, table, or the like in the foregoing embodiments. The processor and the memory may be separately disposed, or may be integrated with each other.

In another possible design, the apparatus 2700 may further include a transceiver 2705 and an antenna 2706. The processor 2701 maybe referred to as a processing unit, and controls an apparatus (a terminal or a base station). The transceiver 2705 may be referred to as a transceiver, a transceiver circuit, a transceiver unit, or the like, and is configured to implement a transceiver function of the apparatus by using the antenna 2706.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor, or the like. The steps in the methods disclosed with reference to embodiments of this application may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (Read-Only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example but not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and methods described in this specification includes but is not limited to these and any memory of another proper type.

An embodiment of this application further provides a computer-readable medium. The computer-readable medium stores a computer program. When the computer program is executed by a computer, the method in the foregoing method embodiments is implemented.

An embodiment of this application further provides a computer program product. When the computer program product is executed by a computer, the method in the foregoing method embodiments is implemented.

An embodiment of this application further provides a communication system. The communication system includes a transmitting end and a receiving end. The transmitting end may implement the method described in the foregoing method embodiments, and the receiving end may implement the method described in the foregoing method embodiments.

All or some of the foregoing embodiments may be implemented by using software, hardware, firmware, or any combination thereof. When software is used to implement the embodiments, all or some of the embodiments maybe implemented in a form of a computer program product. The computer program product includes one or more computer instructions. When the computer instructions are loaded and executed on a computer, the procedure or functions according to embodiments of this application are all or partially generated. The computer maybe a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, an SSD), or the like.

An embodiment of this application further provides a processing apparatus, including a processor and an interface. The processor is configured to perform the method described in the foregoing method embodiments.

It should be understood that the foregoing processing apparatus may be a chip. The processor may be implemented by using hardware, or may be implemented by using software. When being implemented by using hardware, the processor may be a logic circuit, an integrated circuit, or the like. When being implemented by using software, the processor may be a general-purpose processor, and is implemented by reading software code stored in a memory. The memory may be integrated into the processor, or may exist independently outside the processor.

Figure 28:
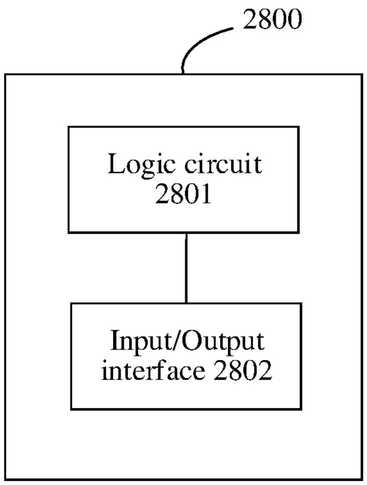
FIG. 28 is a schematic diagram of a structure of a communication apparatus according to an embodiment of this application.

In a possible design, when the communication apparatus is a chip, for example, a chip at a transmitting end or a chip at a receiving end, the processing unit 2601 or the processor 2701 may be one or more logic circuits, and the transceiver unit 2602 or the transceiver 2705 may be an input/output interface, or may be referred to as a communication interface, an interface circuit, an interface, or the like. Alternatively, the transceiver 2705 may be a sending unit and a receiving unit. The sending unit may be an output interface, and the receiving unit may be an input interface. The sending unit and the receiving unit are integrated into one unit, for example, an input/output interface. As shown in FIG. 28, a communication apparatus shown in FIG. 28 includes a logic circuit 2801 and an input/output interface 2802. That is, the processing unit 2601 or the processor 2701 may be implemented through the logic circuit 2801, and the transceiver unit 2602 or the transceiver 2705 may be implemented through the input/output interface 2802. The logic circuit 2801 maybe a chip, a processing circuit, an integrated circuit, a system on chip (system on chip, SoC) chip, or the like. The input/output interface 2802 may be a communication interface, an input/output interface, or the like. In this embodiment of this application, the logic circuit and the input/output interface may be alternatively coupled to each other. A specific manner of a connection between the logic circuit and the input/output interface is not limited in this embodiment of this application.

In some embodiments of this application, the logic circuit and the input/output interface may be configured to perform a function, an operation, or the like performed by the transmitting end or the receiving end.

For example, the logic circuit 2801 is configured to obtain a first signal.

The input/output interface 2802 is configured to send the first signal.

For functions or operations performed by the transmitting end or the receiving end, refer to the foregoing method embodiments. Details are not described herein again.

A person of ordinary skill in the art may be aware that, units and algorithm steps in the examples described with reference to embodiments disclosed in this specification can be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and maybe other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units maybe implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments in this application.

In addition, function units in embodiments of this application maybe integrated into one processing unit, and each of the units may exist alone physically, or two or more units may be integrated into one unit. The integrated unit may be implemented in a form of hardware, or maybe implemented in a form of a software function unit.

Based on descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in the computer-readable medium. The computer-readable medium includes a computer storage medium and a communication medium, and the communication medium includes any medium that enables a computer program to be transmitted from one place to another. The storage medium may be any available medium accessible to a computer.

In conclusion, the foregoing descriptions are merely example embodiments of the technical solutions of this application, but are not intended to limit the protection scope of this application. Any modification, equivalent replacement, improvement, or the like made without departing from the principle of this application shall fall within the protection scope of this application.

What is claimed is:

1. A method, comprising:

obtaining, by a transmitting end, a first signal; and sending, by the transmitting end, the first signal, wherein the first signal comprises a data signal and M reference signals, and the M reference signals comprise: M1 first imaginary reference signals or M2 first real reference signals, wherein M=M1+M2, M is an integer greater than 0, M1 is an integer greater than or equal to 0, and M2 is an integer greater than or equal to 0, wherein the M1 first imaginary reference signals are located at a real signal location of the first signal, the real signal location being a location of a waveform for carrying a real data signal, and wherein the M2 first real reference signals are located at an imaginary signal location of the first signal, the imaginary signal location being a location of the waveform for carrying an imaginary data signal.

2. The method according to claim 1, wherein:

amplitudes of the M1 first imaginary reference signals are a first preset value; and amplitudes of the M2 first real reference signals are a second preset value.

3. The method according to claim 1, wherein:

a polarity of the M reference signals is the same as a polarity of an interference signal to the M reference signals.

4. The method according to claim 1, wherein:

a polarity of a first imaginary reference signal of the M1 first imaginary reference signals is the same as a polarity of an adjacent first imaginary reference signal of the M1 first imaginary reference signals; and a polarity of a first real reference signal of the M2 first real reference signals is the same as a polarity of an adjacent first real reference signal of the M2 first real reference signals.

5. The method according to claim 1, wherein:

a polarity of the M reference signals is determined based on an identifier of a device that receives the first signal or is determined based on an identifier of the transmitting end.

6. The method according to claim 1, wherein;

the data signal comprises two real data signals and two imaginary data signals, the two real data signals are located at the real signal location, and the two imaginary data signals are located at the imaginary signal location;

the two imaginary data signals are adjacent to the M1 first imaginary reference signals and have a same amplitude and opposite polarities; and the two real data signals are adjacent to the M2 first real reference signals and have a same amplitude and opposite polarities.

7. The method according to claim 1, wherein:

the first signal further comprises: M3 second imaginary reference signals or M4 second real reference signals, wherein M3 is an integer greater than or equal to 0, and M4 is an integer greater than or equal to 0;

interference signals of the M1 first imaginary reference signals comprise a first interference signal and a second interference signal, a sum of a value of the first interference signal and a value of the second interference signal or an amplitude of the sum is a third preset value, the first interference signal is an interference signal caused by the data signal to the M1 first imaginary reference signals, and the second interference signal is an interference signal caused by the M3 second imaginary reference signals to the M1 first imaginary reference signals; and interference signals of the M2 first real reference signals comprise a third interference signal and a fourth interference signal, a sum of a value of the third interference signal and a value of the fourth interference signal or an amplitude of the sum is a fourth preset value, the third interference signal is an interference signal caused by the data signal to the M2 first real reference signals, and the fourth interference signal is an interference signal caused by the M4 second real reference signals to the M2 first real reference signals.

8. The method according to claim 7, wherein:

the M3 second imaginary reference signals and the M1 first imaginary reference signals are arranged at intervals; and the M4 second real reference signals and the M2 first real reference signals are arranged at intervals.

9. A method, comprising:

obtaining, by a receiving end, a second signal; and processing, by the receiving end, the second signal to obtain a third signal, wherein the third signal comprises a data signal and M reference signals, and the M reference signals comprise: M1 first imaginary reference signals or M2 first real reference signals, wherein M=M1+M2, M is an integer greater than 0, M1 is an integer greater than or equal to 0, and M2 is an integer greater than or equal to 0, wherein the M1 first imaginary reference signals are located at a real signal location of the third signal, the real signal location being a location of a waveform for carrying a real data signal, and wherein the M2 first real reference signals are located at an imaginary signal location of the third signal, the imaginary signal location being a location of the waveform for carrying an imaginary data signal.

10. The method according to claim 9, wherein:

amplitudes of the M1 first imaginary reference signals are a first preset value; and amplitudes of the M2 first real reference signals are a second preset value.

11. The method according to claim 9, wherein: a polarity of the M reference signals is the same as a polarity of an interference signal to the M reference signals.

12. The method according to claim 9, wherein a polarity of a first imaginary reference signal of the M1 first imaginary reference signals is the same as a polarity of an adjacent first imaginary reference signal of the M1 first imaginary reference signals; and a polarity of a first real reference signal of the M2 first real reference signals is the same as a polarity of an adjacent first real reference signal of the M2 first real reference signals.

13. The method according to claim 9, wherein a polarity of the M reference signals is determined based on an identifier of the receiving end, or is determined based on an identifier of a device that sends the third signal.

14. The method according to claim 9, wherein:

the data signal comprises two real data signals and two imaginary data signals, the two real data signals are located at the real signal location, and the two imaginary data signals are located at the imaginary signal location; and the two imaginary data signals are adjacent to the M1 first imaginary reference signals and have a same amplitude and opposite polarities; and the two real data signals are adjacent to the M2 first real reference signals and have a same amplitude and opposite polarities.

15. The method according to claim 9, wherein:

the third signal further comprises: M3 second imaginary reference signals or M4 second real reference signals, wherein M3 is an integer greater than or equal to 0, and M4 is an integer greater than or equal to 0;

interference signals of the M1 first imaginary reference signals comprise a first interference signal and a second interference signal, a sum of a value of the first interference signal and a value of the second interference signal or an amplitude of the sum is a third preset value, the first interference signal is an interference signal caused by the data signal to the M1 first imaginary reference signals, and the second interference signal is an interference signal caused by the M3 second imaginary reference signals to the M1 first imaginary reference signals; and interference signals of the M2 first real reference signals comprise a third interference signal and a fourth interference signal, a sum of a value of the third interference signal and a value of the fourth interference signal or an amplitude of the sum is a fourth preset value, the third interference signal is an interference signal caused by the data signal to the M2 first real reference signals, and the fourth interference signal is an interference signal caused by the M4 second real reference signals to the M2 first real reference signals.

16. The method according to claim 15, wherein:

the M3 second imaginary reference signals and the M1 first imaginary reference signals are arranged at intervals; and the M4 second real reference signals and the M2 first real reference signals are arranged at intervals.

17. A communication apparatus, comprising:

one or more processors;

a non-transitory computer-readable storage medium storing a program to be executed by the one or more processors, the program including instructions for:

obtaining a first signal, wherein the first signal comprises a data signal and M reference signals, and the M reference signals comprise: M1 first imaginary reference signals or M2 first real reference signals, wherein M=M1+M2, M is an integer greater than 0, M1 is an integer greater than or equal to 0, and M2 is an integer greater than or equal to 0, wherein the M1 first imaginary reference signals are located at a real signal location of the first signal, the real signal location being a location of a waveform for carrying a real data signal, and wherein the M2 first real reference signals are located at an imaginary signal location of the first signal, the imaginary signal location being a location of the waveform for carrying an imaginary data signal; and a transceiver configured to send the first signal.

18. The communication apparatus according to claim 17, wherein:

amplitudes of the M1 first imaginary reference signals are a first preset value; and amplitudes of the M2 first real reference signals are a second preset value.

19. The communication apparatus according to claim 17, wherein a polarity of the M reference signals is the same as a polarity of an interference signal to the M reference signals.

20. The communication apparatus according to claim 17, wherein:

a polarity of a first imaginary reference signal of the M1 first imaginary reference signals is the same as a polarity of an adjacent first imaginary reference signal of the M1 first imaginary reference signals; and a polarity of a first real reference signal of the M2 first real reference signals is the same as a polarity of an adjacent first real reference signal of the M2 first real reference signals.

* * * * *